United States Patent
Awoniyi-Oteri et al.

(10) Patent No.: US 10,111,125 B2
(45) Date of Patent: Oct. 23, 2018

(54) BANDWIDTH INFORMATION DETERMINATION FOR FLEXIBLE BANDWIDTH CARRIERS

(71) Applicant: QUALCOMM Incorporated, San Diego, CA (US)

(72) Inventors: Olufunmilola O. Awoniyi-Oteri, San Diego, CA (US); Soumya Das, San Diego, CA (US); Edwin C. Park, San Diego, CA (US); Roy Franklin Quick, Jr., San Diego, CA (US); Samir Salib Soliman, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 7 days.

(21) Appl. No.: 15/222,200

(22) Filed: Jul. 28, 2016

(65) Prior Publication Data

US 2016/0337907 A1    Nov. 17, 2016

Related U.S. Application Data

(62) Division of application No. 13/670,308, filed on Nov. 6, 2012, now Pat. No. 9,532,251.

(Continued)

(51) Int. Cl.
*H04B 7/00* (2006.01)
*H04B 15/00* (2006.01)
(Continued)

(52) U.S. Cl.
CPC ........... *H04W 24/10* (2013.01); *H04W 28/20* (2013.01); *H04W 36/0022* (2013.01);
(Continued)

(58) Field of Classification Search
CPC . H04W 24/10; H04W 28/20; H04W 36/0022; H04W 36/0083; H04W 48/08; H04L 1/0038
(Continued)

(56) References Cited

U.S. PATENT DOCUMENTS 5,117,443 A    5/1992 Shires
5,640,385 A    6/1997 Long et al.
(Continued)

FOREIGN PATENT DOCUMENTS

CN    1399855 A    2/2003
CN    1666453 A    9/2005
(Continued)

OTHER PUBLICATIONS

"3rd Generation Partnership Project, Technical Specification Group Radio Access Network, Evolved Universal Terrestrial Radio Access (E-UTRA) and Evolved Universal Terrestrial Radio Access Network (E-UTRAN), Overall Description, Stage 2 (Release 10)", 3GPP Standard, 3GPP TS 136.300, 3rd Generation Partnership Project (3gpp), Mobile Competence Centre, 650, Route Des Lucioles, F-06921 Sophia-Antipolis Cedex, France, val. RAN WG2, No. V10.4.0, Jun. 22, 2011, XP050553479, pp. 1-194.
(Continued)

*Primary Examiner* — Tilahun B Gesesse
(74) *Attorney, Agent, or Firm* — Holland & Hart LLP

(57) ABSTRACT

Methods, systems, and devices for wireless communication are provided for mobility management for wireless communications systems that utilize a flexible bandwidth carrier. Some embodiments include approaches for determining bandwidth information, such as one or more bandwidth scaling factors N and/or flexible bandwidths, at a user equipment (UE), where the bandwidth information may not be signaled to the UE. Embodiments for determining band-
(Continued)

width information include: random ordered bandwidth scaling factor approaches, delay ordered bandwidth scaling factor approaches, storing bandwidth scaling factor value in UE Neighbor Record approaches, spectrum measurement approaches, spectrum calculation approaches, and/or a priori approaches. Flexible bandwidth carrier systems may utilize spectrum portions that may not be big enough to fit a normal waveform. Flexible bandwidth carrier systems may be generated through dilating, or scaling down, time, frame lengths, bandwidth, or the chip rate of the flexible bandwidth carrier systems with respect to a normal bandwidth carrier system.

30 Claims, 15 Drawing Sheets

Related U.S. Application Data

(60) Provisional application No. 61/607,502, filed on Mar. 6, 2012, provisional application No. 61/568,742, filed on Dec. 9, 2011, provisional application No. 61/556,777, filed on Nov. 7, 2011.

(51) Int. Cl.
*H04W 24/10* (2009.01)
*H04W 36/00* (2009.01)
*H04W 28/20* (2009.01)
*H04W 48/08* (2009.01)
*H04L 1/00* (2006.01)

(52) U.S. Cl.
CPC ....... *H04W 36/0083* (2013.01); *H04L 1/0038* (2013.01); *H04W 48/08* (2013.01)

(58) Field of Classification Search
USPC .............. 455/509, 550.1, 507; 370/231, 233
See application file for complete search history.

(56) References Cited

U.S. PATENT DOCUMENTS

| | | | |
|---|---|---|---|
| 5,949,767 A | 9/1999 | Shoji | |
| 6,041,222 A | 3/2000 | Horton et al. | |
| 6,115,370 A * | 9/2000 | Struhsaker | H04Q 11/0457 370/342 |
| 6,131,012 A * | 10/2000 | Struhsaker | H04Q 11/00 455/3.05 |
| 6,144,645 A * | 11/2000 | Struhsaker | H04L 1/007 370/280 |
| 6,236,647 B1 | 5/2001 | Amalfitano | |
| 6,424,826 B1 | 7/2002 | Horton et al. | |
| 6,434,129 B1 * | 8/2002 | Struhsaker | H04L 1/0071 370/329 |
| 6,449,596 B1 | 9/2002 | Ejima | |
| 6,535,723 B1 | 3/2003 | Jiang et al. | |
| 6,539,050 B1 | 3/2003 | Lee et al. | |
| 6,693,887 B2 | 2/2004 | Stanwood et al. | |
| 6,694,147 B1 | 2/2004 | Viswanath et al. | |
| 6,829,227 B1 | 12/2004 | Pitt et al. | |
| 6,845,238 B1 | 1/2005 | Mueller | |
| 6,944,460 B2 | 9/2005 | Haartsen | |
| 7,010,300 B1 | 3/2006 | Jones et al. | |
| 7,069,035 B2 | 6/2006 | Chen et al. | |
| 7,123,710 B2 | 10/2006 | Ravishankar | |
| 7,123,910 B2 | 10/2006 | Lucidarme et al. | |
| 7,145,876 B2 | 12/2006 | Huang et al. | |
| 7,193,982 B2 | 3/2007 | Frerking et al. | |
| 7,263,365 B2 * | 8/2007 | Rudowicz | H04B 1/1036 455/450 |
| 7,321,780 B2 | 1/2008 | Love et al. | |
| 7,324,553 B1 | 1/2008 | Varier et al. | |
| 7,394,792 B1 | 7/2008 | Von | |
| 7,535,900 B2 | 5/2009 | Shenoi | |
| 7,558,310 B1 | 7/2009 | Von | |
| 7,602,707 B2 | 10/2009 | Guo et al. | |
| 7,706,350 B2 | 4/2010 | Gorokhov et al. | |
| 7,796,632 B2 | 9/2010 | Hasty et al. | |
| 7,839,900 B1 | 11/2010 | Herder et al. | |
| 7,865,359 B2 | 1/2011 | Chang | |
| 7,898,947 B2 * | 3/2011 | Briscoe | H04L 41/0806 370/230 |
| 7,953,167 B2 | 5/2011 | Ode et al. | |
| 7,969,858 B2 | 6/2011 | Laroia et al. | |
| 8,000,706 B2 | 8/2011 | Lee et al. | |
| 8,045,972 B2 | 10/2011 | Ferzali et al. | |
| 8,054,893 B2 | 11/2011 | Mizusawa | |
| 8,064,398 B2 | 11/2011 | Agashe et al. | |
| 8,085,713 B2 | 12/2011 | Kang | |
| 8,085,731 B2 | 12/2011 | Zhao et al. | |
| 8,150,344 B1 | 4/2012 | Goyal et al. | |
| 8,169,953 B2 | 5/2012 | Damnjanovic et al. | |
| 8,325,670 B2 | 12/2012 | Afrashteh et al. | |
| 8,514,883 B2 | 8/2013 | Pan et al. | |
| 8,547,840 B1 * | 10/2013 | Kumar | H04L 43/0894 370/231 |
| 8,768,373 B2 | 7/2014 | Soliman et al. | |
| 8,804,693 B2 | 8/2014 | Dural et al. | |
| 8,837,375 B2 | 9/2014 | Das et al. | |
| 8,873,505 B2 | 10/2014 | Zhang et al. | |
| 9,001,679 B2 | 4/2015 | Das et al. | |
| 9,049,633 B2 | 6/2015 | Das et al. | |
| 9,055,496 B2 | 6/2015 | Das et al. | |
| 9,220,101 B2 | 12/2015 | Awoniyi et al. | |
| 2001/0012271 A1 | 8/2001 | Berger | |
| 2002/0065089 A1 | 5/2002 | Soliman | |
| 2002/0110101 A1 | 8/2002 | Gopalakrishnan et al. | |
| 2002/0158801 A1 | 10/2002 | Crilly et al. | |
| 2002/0159501 A1 | 10/2002 | Agami et al. | |
| 2003/0081538 A1 | 5/2003 | Walton et al. | |
| 2003/0203721 A1 | 10/2003 | Berezdivin et al. | |
| 2003/0224730 A1 | 12/2003 | Muszynski et al. | |
| 2004/0128110 A1 | 7/2004 | Schulte et al. | |
| 2005/0065784 A1 | 3/2005 | McAulay et al. | |
| 2005/0208973 A1 | 9/2005 | Iochi | |
| 2006/0171424 A1 | 8/2006 | Choi | |
| 2006/0246930 A1 | 11/2006 | Kim et al. | |
| 2006/0250935 A1 | 11/2006 | Hamamoto et al. | |
| 2006/0291429 A1 | 12/2006 | Matusz | |
| 2007/0049307 A1 | 3/2007 | Mueckenheim et al. | |
| 2007/0081604 A1 | 4/2007 | Khan et al. | |
| 2007/0147226 A1 | 6/2007 | Khandekar et al. | |
| 2007/0217440 A1 | 9/2007 | Cho et al. | |
| 2007/0230414 A1 | 10/2007 | Afrashteh et al. | |
| 2007/0268959 A1 | 11/2007 | Bi et al. | |
| 2008/0026752 A1 | 1/2008 | Flore et al. | |
| 2008/0095108 A1 | 4/2008 | Malladi et al. | |
| 2008/0144612 A1 | 6/2008 | Honkasalo et al. | |
| 2008/0151743 A1 | 6/2008 | Tong et al. | |
| 2008/0165892 A1 | 7/2008 | Yang et al. | |
| 2008/0227453 A1 | 9/2008 | Somasundaram et al. | |
| 2008/0253320 A1 | 10/2008 | Piggin et al. | |
| 2008/0298442 A1 | 12/2008 | Deng et al. | |
| 2009/0016320 A1 | 1/2009 | Li et al. | |
| 2009/0042532 A1 | 2/2009 | Bienas et al. | |
| 2009/0074039 A1 | 3/2009 | Miller | |
| 2009/0094650 A1 | 4/2009 | Carmichael | |
| 2009/0116389 A1 | 5/2009 | Ji et al. | |
| 2009/0135713 A1 | 5/2009 | Hwang et al. | |
| 2009/0141689 A1 | 6/2009 | Parekh et al. | |
| 2009/0161732 A1 | 6/2009 | Miller et al. | |
| 2009/0191863 A1 | 7/2009 | Kazmi | |
| 2009/0252134 A1 | 10/2009 | Schlicht et al. | |
| 2009/0258671 A1 | 10/2009 | Kekki et al. | |
| 2009/0274096 A1 | 11/2009 | Fu | |
| 2009/0323608 A1 | 12/2009 | Adachi et al. | |
| 2010/0015923 A1 | 1/2010 | Golitschek | |
| 2010/0061496 A1 | 3/2010 | Black et al. | |
| 2010/0124940 A1 | 5/2010 | Hassan et al. | |
| 2010/0157910 A1 | 6/2010 | Nentwig et al. | |
| 2010/0159859 A1 | 6/2010 | Rofougaran | |

(56) References Cited

U.S. PATENT DOCUMENTS

| | | |
|---|---|---|
| 2010/0167741 A1 | 7/2010 | Lee |
| 2010/0195618 A1 | 8/2010 | Park et al. |
| 2010/0195619 A1 | 8/2010 | Bonneville et al. |
| 2010/0195668 A1 | 8/2010 | Robert et al. |
| 2010/0214031 A1 | 8/2010 | Yamamoto et al. |
| 2010/0222060 A1 | 9/2010 | Zhang et al. |
| 2010/0234040 A1 | 9/2010 | Palanki et al. |
| 2010/0240356 A1 | 9/2010 | Lee et al. |
| 2010/0246480 A1 | 9/2010 | Aggarwal et al. |
| 2010/0255849 A1 | 10/2010 | Ore |
| 2010/0260105 A1 | 10/2010 | Keller et al. |
| 2010/0279691 A1 | 11/2010 | Dwyer et al. |
| 2010/0303039 A1 | 12/2010 | Zhang et al. |
| 2010/0322109 A1 | 12/2010 | Ahn et al. |
| 2010/0322119 A1 | 12/2010 | Li et al. |
| 2010/0323622 A1 | 12/2010 | Nentwig |
| 2011/0013530 A1 | 1/2011 | Rinne et al. |
| 2011/0013550 A1 | 1/2011 | Wu |
| 2011/0013578 A1 | 1/2011 | Shimizu et al. |
| 2011/0019556 A1 | 1/2011 | Hsin et al. |
| 2011/0021216 A1 | 1/2011 | Pudney et al. |
| 2011/0064162 A1 | 3/2011 | McCallister et al. |
| 2011/0066429 A1 | 3/2011 | Shperling et al. |
| 2011/0080893 A1 | 4/2011 | Fong et al. |
| 2011/0085497 A1 | 4/2011 | Fang et al. |
| 2011/0086657 A1 | 4/2011 | Koivisto et al. |
| 2011/0103243 A1* | 5/2011 | Larsson ................. H04L 5/001 370/252 |
| 2011/0103330 A1 | 5/2011 | Montojo et al. |
| 2011/0128922 A1 | 6/2011 | Chen et al. |
| 2011/0134831 A1* | 6/2011 | Pirskanen .............. H04L 5/001 370/328 |
| 2011/0149853 A1 | 6/2011 | Olsson et al. |
| 2011/0151913 A1 | 6/2011 | Forster et al. |
| 2011/0164707 A1 | 7/2011 | Luo et al. |
| 2011/0205976 A1 | 8/2011 | Roessel et al. |
| 2011/0208976 A1* | 8/2011 | Zaabab .................. G06F 7/728 713/189 |
| 2011/0217980 A1 | 9/2011 | Faurie et al. |
| 2011/0244870 A1 | 10/2011 | Lee |
| 2011/0267978 A1* | 11/2011 | Etemad .................. H04L 5/003 370/254 |
| 2011/0268045 A1 | 11/2011 | Heo et al. |
| 2011/0269453 A1 | 11/2011 | Ranta-Aho et al. |
| 2011/0276701 A1 | 11/2011 | Purnadi et al. |
| 2011/0310835 A1 | 12/2011 | Cho et al. |
| 2012/0002643 A1 | 1/2012 | Chung et al. |
| 2012/0015656 A1 | 1/2012 | Tiwari |
| 2012/0044844 A1 | 2/2012 | Trainin |
| 2012/0063421 A1 | 3/2012 | Wu |
| 2012/0102162 A1 | 4/2012 | Devireddy |
| 2012/0113982 A1 | 5/2012 | Akselin et al. |
| 2012/0120789 A1 | 5/2012 | Ramachandran et al. |
| 2012/0140743 A1 | 6/2012 | Pelletier et al. |
| 2012/0142367 A1 | 6/2012 | Przybylski |
| 2012/0149377 A1 | 6/2012 | Su et al. |
| 2012/0157101 A1 | 6/2012 | Uemura et al. |
| 2012/0163249 A1 | 6/2012 | Chin et al. |
| 2012/0165019 A1 | 6/2012 | Shintani et al. |
| 2012/0195209 A1 | 8/2012 | Jain et al. |
| 2012/0202501 A1 | 8/2012 | Morioka et al. |
| 2013/0017805 A1 | 1/2013 | Andre-Joensson et al. |
| 2013/0044613 A1 | 2/2013 | Edara et al. |
| 2013/0083778 A1 | 4/2013 | Wang |
| 2013/0084870 A1 | 4/2013 | Nylander et al. |
| 2013/0114415 A1 | 5/2013 | Das et al. |
| 2013/0114433 A1 | 5/2013 | Park et al. |
| 2013/0114436 A1 | 5/2013 | Dural et al. |
| 2013/0114473 A1 | 5/2013 | Awoniyi et al. |
| 2013/0114566 A1 | 5/2013 | Awoniyi et al. |
| 2013/0114571 A1 | 5/2013 | Das et al. |
| 2013/0115967 A1 | 5/2013 | Soliman et al. |
| 2013/0115991 A1 | 5/2013 | Awoniyi et al. |
| 2013/0115994 A1 | 5/2013 | Awoniyi et al. |
| 2013/0121265 A1 | 5/2013 | Awoniyi et al. |
| 2013/0122921 A1 | 5/2013 | Juppi et al. |
| 2013/0148520 A1 | 6/2013 | Das et al. |
| 2013/0148527 A1 | 6/2013 | Awiniyi et al. |
| 2013/0148576 A1 | 6/2013 | Huang et al. |
| 2013/0148579 A1 | 6/2013 | Das et al. |
| 2013/0148627 A1 | 6/2013 | Das et al. |
| 2013/0148628 A1 | 6/2013 | Das et al. |
| 2013/0148629 A1 | 6/2013 | Das et al. |
| 2013/0150045 A1 | 6/2013 | Das et al. |
| 2013/0176952 A1 | 7/2013 | Shin et al. |
| 2013/0182655 A1 | 7/2013 | Das et al. |
| 2013/0329670 A1 | 12/2013 | Tang et al. |
| 2014/0010170 A1 | 1/2014 | Das et al. |
| 2014/0044431 A1 | 2/2014 | Hussain et al. |
| 2014/0206350 A1 | 7/2014 | Rinne et al. |

FOREIGN PATENT DOCUMENTS

| | | |
|---|---|---|
| CN | 1998171 A | 7/2007 |
| CN | 101052216 A | 10/2007 |
| CN | 101296139 A | 10/2008 |
| CN | 101299755 A | 11/2008 |
| CN | 101370227 A | 2/2009 |
| CN | 101426292 A | 5/2009 |
| CN | 101990211 A | 3/2011 |
| CN | 101998645 A | 3/2011 |
| EP | 1213868 A1 | 6/2002 |
| EP | 1816666 A1 | 8/2007 |
| EP | 1993237 A2 | 11/2008 |
| EP | 2317816 A1 | 5/2011 |
| EP | 2385653 A2 | 11/2011 |
| EP | 2493257 A1 | 8/2012 |
| GB | 2386506 A | 9/2003 |
| GB | 2421880 A | 7/2006 |
| JP | 8065731 A | 3/1996 |
| JP | H08288884 A | 11/1996 |
| JP | H10511818 A | 11/1998 |
| JP | 2002330467 A | 11/2002 |
| JP | 2002344965 A | 11/2002 |
| JP | 2003051849 A | 2/2003 |
| JP | 2003264524 A | 9/2003 |
| JP | 2004173019 A | 6/2004 |
| JP | 2004228927 A | 8/2004 |
| JP | 2004350259 A | 12/2004 |
| JP | 2006094005 A | 4/2006 |
| JP | 2006515119 A | 5/2006 |
| JP | 2006303739 A | 11/2006 |
| JP | 2007074737 A | 3/2007 |
| JP | 2008543222 A | 11/2008 |
| JP | 2008300989 A | 12/2008 |
| JP | 2009060601 A | 3/2009 |
| JP | 2009218638 A | 9/2009 |
| JP | 2009532965 A | 9/2009 |
| JP | 2009545227 A | 12/2009 |
| JP | 2010101397 A | 1/2010 |
| JP | 2010011506 A | 1/2010 |
| JP | 2010522500 A | 7/2010 |
| JP | 2010226247 A | 10/2010 |
| JP | 2010273318 A | 12/2010 |
| JP | 2011097443 A | 5/2011 |
| JP | 2011521507 A | 7/2011 |
| JP | 2011176687 A | 9/2011 |
| JP | 2012015992 A | 1/2012 |
| JP | 2012525723 A | 10/2012 |
| JP | 2013509055 A | 3/2013 |
| JP | 2013516859 A | 5/2013 |
| JP | 2013524607 A | 6/2013 |
| KR | 20070049091 A | 5/2007 |
| KR | 20070058683 A | 6/2007 |
| KR | 20080034857 A | 4/2008 |
| KR | 20080106092 A | 12/2008 |
| KR | 20090015857 A | 2/2009 |
| KR | 2011006765 A | 6/2011 |
| WO | WO-9610320 A2 | 4/1996 |
| WO | WO-9900911 A1 | 1/1999 |
| WO | WO-0120942 A1 | 3/2001 |
| WO | WO-03034645 A1 | 4/2003 |
| WO | WO-03092212 A1 | 11/2003 |
| WO | WO-2004077712 A1 | 9/2004 |

(56) References Cited

FOREIGN PATENT DOCUMENTS

| WO | WO-05096538 | 10/2005 |
|---|---|---|
| WO | WO-2005112566 A2 | 12/2005 |
| WO | WO-2006046307 A1 | 5/2006 |
| WO | WO-2006110875 A1 | 10/2006 |
| WO | WO-2006125149 A2 | 11/2006 |
| WO | WO-2006132778 A2 | 12/2006 |
| WO | WO-2007024748 A2 | 3/2007 |
| WO | WO-07050921 | 5/2007 |
| WO | WO-2007113319 A1 | 10/2007 |
| WO | WO-2007148911 A1 | 12/2007 |
| WO | WO-2008015512 A2 | 2/2008 |
| WO | WO-2008015512 A3 | 5/2008 |
| WO | WO-2008118429 A1 | 10/2008 |
| WO | WO-2008133453 A1 | 11/2008 |
| WO | WO-2009124377 A1 | 10/2009 |
| WO | WO-2010105232 A1 | 9/2010 |
| WO | WO-2010126418 A1 | 11/2010 |
| WO | WO-2010141607 A2 | 12/2010 |
| WO | WO-2010150767 A1 | 12/2010 |
| WO | WO-2010141607 A3 | 3/2011 |
| WO | WO-2011047619 A1 | 4/2011 |
| WO | WO-2011053974 A1 | 5/2011 |
| WO | WO-2011082545 A1 | 7/2011 |
| WO | WO-2011121175 A1 | 10/2011 |
| WO | WO-2013070710 A2 | 5/2013 |
| WO | WO-2013070733 A1 | 5/2013 |
| WO | WO-2013070738 A1 | 5/2013 |
| WO | WO-2013070751 A1 | 5/2013 |

OTHER PUBLICATIONS

"3rd Generation Partnership Project; Technical Specification Group Radio Access Network; Evolved Universal Terrestrial Radio Access (E-UTRA), Radio Resource Control (RRC), Protocol specification (Release 10)", 3GPP Standard, 3GPP TS 136.331, 3rd Generation Partnership Project (3gpp), Mobile Competence Centre, 650, Route Des Lucioles, F-06921 Sophia-Antipolis Cedex, France, vol. RAN WG2, No. V10.2.0, Jun. 24, 2011, XP050553577, pp. 1-298.
Qualcomm Incorporated, "Use Cases for Extension Carriers," 3GPP TSG-RAN WG1 #66bis, R1-113382,Oct. 2011, pp. 1-3, URL, http://www.3gpp.org/ftp/tsg_ran/WG1_RL1/TSGR1_66b/Docs/R1-113382.zip.
ZTE: "Introduction of Additional Carrier Types", 3GPP TSG-RAN WG1 Meeting #66 R1-112248, URL: http://www.3gpp.org/ftp/tsg_ran/WG1_RL1/TSGR1_66/Docs/R1-112248.zip, Aug. 16, 2011, pp. 1-4.
3GPP TS 23.009 V11.0.0 (Sep. 2011), 3rd Generation Partnership Project; Technical Specification Group Core Network and Terminals; Handover procedures (Release 11).
3GPP TS 25.213 "3rd Generation Partnership Project; Technical Specification Group Radio Access Network; Spreading and modulation," version 9.2.0, release 9, Sep. 2010.
3GPP TS 25.331 v11.0.0 (Dec. 2011), 3rd Generation Partnership Project; Technical Specification Group Radio Access Network; Radio Resource Control (RRC); Protocol specification (Release 11).
3GPP TS 25.413 V10.5.0 (Mar. 2012), 3rd Generation Partnership Project; Technical Specification Group Radio Access Network; UTRAN Iu interface, Radio Access Network Application Part (RANAP) signalling (Release 10).
3GPP TS 34.108 V9.6.0 (Sep. 2011), 3rd Generation Partnership Project; Technical Specification Group Radio Access Network; Common test environments for User Equipment (UE); Conformance testing (Release 9).
3GPP TS 36.304 "3rd Generation Partnership Project; Technical Specification Group Radio Access Network; Evolved Universal Terrestrial Radio Access (E-UTRA); User Equipment (UE) procedures in idle mode (Release 10)", 3GPP Standard; 3GPP TS 36.304, 3rd Generation Partnership Project (3GPP), Mobile Competence Centre ; 650, Route Des Lucioles ; F-06921 Sophia-Antipolis Cedex ; France, vol. RAN WG2, No. V10.3.0, Sep. 28, 2011, (Sep. 28, 2011), pp. 1-33, XP050554208, [retrieved on Sep. 28, 2011].
3GPP TS 36.331, "3rd Generation Partnership Project; Technical Specification Group Radio Access Network; Evolved Universal Terrestrial Radio Access (E-UTRA); Radio Resource Control (RRC); Protocol specificatin (Release 10)", 3GPP Standard; 3GPP TS 36.331, 3rd Generation Partnership Project (3GPP), Mobile Competence Centre ; 650, Route Des Lucioles ; F-06921 Sophia-Antipolis Cedex ; France, vol. RAN WG2, No. V10.3.0, Sep. 30, 2011, (Sep. 30, 2011), pp. 1-296, XP050554294, [retrieved on Sep. 30, 2011].
3GPPTS 36.101, "3rd Generation Partnership Project; Technical Specification Group Radio Access Network; Evolved Universal Terrestrial Radio Access (E-UTRA); User Equipment (UE) radio transmission and reception (Release 10)", 3GPP Standard; 3GPP TS 36.101, 3rd Generation Partnership Project (3GPP), Mobile Competence Centre ; 650, Route Des Lucioles; F-06921 Sophia-Antipolis Cedex ; France, vol. RAN WG4, No. V10.4.0, Oct. 3, 2011, (Oct. 3, 2011), pp. 1-242, XP050554352, [retrieved on Oct. 3, 2011].
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", 3GPP Standard; 3GPP TS 36.300, 3rd Generation Partnership Project (3GPP), Mobile Competence Centre ; 650, Route Des Lucioles ; F-06921 Sophia-Antipolis Cedex; France, vol. RAN WG2, No. V10.5.0, Sep. 28, 2011, (Sep. 28, 2011), pp. 1-194, XP050554206, [retrieved on Sep. 28, 2011].
3rd Generation Partnership Project; Technical Specification Group Radio Access Network; Evolved Universal Terrestrial Radio Access (E-UTRA); Relay architectures for E-UTRA (LTE-Advanced) (Release 9), 3GPP Standard; 3GPP TR 36.806, 3rd Generation Partnership Project (3GPP), Mobile Competence Centre; 650, Route Des Lucioles; F-06921 Sophia-Antipolis Cedex; France, No. V9.0.0, Apr. 21, 2010, (Apr. 21, 2010), pp. 1-34, XP050402561, [retrieved on Apr. 21, 2010].
"3rd Generation Partnership Project; Technical Specification Group Services and System Aspects; Circuit Switched (CS) fallback, in Evolved Packet System (EPS); Stage 2 (Release 10)", 3GPP Standard; 3GPP TS 23.272, 3rd Generation Partnership Project (3GPP), Mobile Competence Centre ; 650, Route Des Lucioles ; F-06921 Sophiaantipolis Cedex ; France, vol. SA WG2, No. V10.5.0, Aug. 24, 2011, (Aug. 24, 2011), pp. 1-79, XP050553745, [retrieved on Aug. 24, 2011].
"3rd Generation Partnership Project; Technical Specification Group Services and System Aspects; Single Radio Voice Call Continuity (SRVCC); Stage 2 (Release 11)", 3GPP Standard; 3GPP TS 23.216, 3rd Generation Partnership Project (3GPP), Mobile Competence Centre ; 650, Route Des Lucioles ; F-06921 Sophiaantipolis Cedex ; France, vol. SA WG2; No. V11.2.0, Aug. 24, 2011, (Aug. 24, 2011), pp. 1-53, XP050553738, [retrieved on Aug. 24, 2011].
Abeta S., "Toward LTE commercial launch and future plan for LTE enhancements (LTE-Advanced)", Communication Systems (ICCS), 2010 IEEE International Conference on, IEEE, Piscataway, NJ, USA, Nov. 17, 2010, (Nov. 17, 2010), pp. 146-150, XP031848276, ISBN: 978-1-4244-7004-4.
Arjona A., et al., "Live network Performance Challenge FLASH-OFDM Vs HSDPA," 22nd International Conference on Advanced Information Networking and Applications, 2008, pp. 918-925.
Black, et al., "Interference Cancellation Techniques for CDMA2000 1x Reverse Link", IEEE Globecom 2009, Global Telecommunications Conference, 2009, 5 pages.
Co-pending U.S. Appl. No. 13/363,538, filed Feb. 1, 2012.
Co-pending U.S. Appl. No. 13/707,111, filed Dec. 6, 2012.
Co-pending U.S. Appl. No. 14/091,933, filed Nov. 27, 2013.
Ericsson: "LTE Spurious emission concept for flexible bandwidth", 3GPP Draft; R4-051130, 3rd Generation Partnership Project (3GPP), Mobile Competence Centre, 650, Route Des Lucioles; F-06921 Sophia-Antipolis Cedex; France, vol. RAN WG4, No. Seoul, Korea; Nov. 3, 2005, Nov. 3, 2005, XP050174721.

(56) References Cited

OTHER PUBLICATIONS

Gessner C., et al., "Voice and SMS in LTE White Paper," Rohde & Schwarz GmbH & Co. KG, 2011, < URL: http://www2.rohde-schwarz.com/file_15903/1MA197_1e.pdf > pp. 1-45.
Holma, H., et al., "WCDMA for UMTS—HSPA Evolution and LTE (4th Edition)" In: "WCDMA for UMTS—HSPA Evolution and LTE (4th Edition)", Jan. 1, 2007 (Jan. 1, 2007), John Wiley & Sons Ltd., UK, XP055052236, ISBN: 978-0-47-031933-8 ,pp. 74-75.
Huawei, "R2-084311: Scaling measurement and cell reselection parameters," 3GPP TSG RAN WG2 #63 [Online] 2008, pp. 1-8.
IEEE Std 802.11tm-2007: "IEEE Standard for Information technology—Telecommunications and Information exchange between systems—Local and metropolitan area networks—Specific requirements Part 11: Wireless LAN Medium Access Control (MAC) and Physical Layer (PHY) Specifications," 2007, pp. 1-98.
International Search Report and Written Opinion—PCT/US2012/063877—ISA/EPO—dated Apr. 2, 2013.
International Search Report and Written Opinion—PCT/US2012/063880—ISA/EPO—dated Jun. 6, 2013.
International Search Report and Written Opinion—PCT/US2012/063886—ISA/EPO—dated Mar. 26, 2013.
International Search Report and Written Opinion—PCT/US2012/063895—ISA/EPO—dated May 13, 2013.
International Search Report and Written Opinion—PCT/US2012/063903—ISA/EPO—dated Mar. 22, 2013.
International Search Report and Written Opinion—PCT/US2012/063907—ISA/EPO—dated Mar. 19, 2013.
International Search Report and Written Opinion—PCT/US2012/063912—ISA/EPO—dated Mar. 12, 2013.
International Search Report and Written Opinion—PCT/US2012/068530—ISA/EPO—dated Feb. 20, 2013.
International Search Report and Written Opinion—PCT/US2012/068533—ISA/EPO—dated Feb. 12, 2013.
International Search Report and Written Opinion—PCT/US2012/068537—ISA/EPO—dated Feb. 13, 2013.
International Search Report and Written Opinion—PCT/US2012/068544—ISA/EPO—dated Feb. 14, 2013.
International Search Report and Written Opinion—PCT/US2012/063916—ISA/EPO—dated Mar. 20, 2013.
International Search Report and Written Opinion—PCT/US2012/068523—ISA/EPO—dated Feb. 5, 2013.
Klerer M., "Introduction to IEEE 802.20," Technical and procedural Orientation, IEEE 802.20—PD-04, Mar. 10, 2003.
Li, et al., "Mobility management: from GPRS to UMTS," Wireless Communications and Mbile Cmputing, 2001, pp. 339-359.
Marks R.B., "The IEEE 802.16 Wireless MAN Standard for Broadband Wireless Metropolitan Area Networks," Apr. 16, 2003.
NEC Group: "Framework to define additional carrier type: Carrier segments", R1-113227, 3rd Generation Partnership Project (3GPP), Mobile Competence Centre ; 650, Route Des Lucioles ; F-06921 Sophia-Antipolis Cedex ; France, vol. RAN WG1, No. Zhuhai; Oct. 4, 2011 (Oct. 4, 2011),XP050538345.
Qualcomm Incorporated: "Flexible Bandwidth Usage for UMTS FDD", 3GPP Draft; R1-125194 Flexible Bandwidth Usage UMTS_FDD, 3rd Generation Partnership Project—(3GPP), Mobile Competence Centre ; 650, Route Des Lucioles ; F-06921 Sophia-Antipolis Cedex ; France vol. RAN WG1, No. New Orleans, USA; Nov. 12, 2012-Nov. 16, 2012 Nov. 3, 2012 (Nov. 3, 2012), XP050663037, Retrieved from the Internet: URL:http://www.3gpp.org/ftp/tsgran/WG1RL 1/TSGR1_71/Docs/.
Qunhui C., "Evolution and deployment of VoLTE", Huawei Communicate, Sep. 1, 2011 (Sep. 1, 2011), XP055052291, p. 52-p. 55.
R2-073069: E-UTRA Cell Selection and Cell Reselection Aspects. 3GPP TSG-RAN WG2 Meeting #59 [Online] 2007, pp. 1-11.
Samsung: "FDD/TDD dual mode UE capability handling", 3GPP Draft; 36331_CRXXXX_(REL-10)_R2-116035 FDD TDD Dual Mode UE, 3rd Generation Partnership Project (3GPP), Mobile Competence Centre ; 650, Route Des Lucioles ; F-06921 Sophia-Antipolis Cedex ; France, vol. RAN WG2, No. San Francisco, USA; Nov. 14, 2011-Nov. 19, 2011, Nov. 7, 2011 (Nov. 7, 2011), XP050564131, [retrieved on Nov. 7, 2011].
ZTE: "Discussion on activation and deactivation", 3GPP Draft; R2-103719, 3rd Generation Partnership Project (3GPP), Mobile Competence Centre ; 650, Route Des Lucioles ; F-06921 Sophia-Antipolis Cedex ; France, vol. RAN WG2, No. Stockholm, Sweden; Jun. 28, 2010, Jun. 22, 2010 (Jun. 22, 2010), XP050451195, [retrieved on Jun. 22, 2010].
Singh et al., "A Novel Multiple Access Scheme for Mobile Communications Systems," Indian Journal of Radio & Space Physics, Oct. 1, 2007, pp. 430-435, vol. 36, XP_55334645A, Department of Electronics & Electrical Communication Engineering, Indian Institute of Technology, Kharagpur, India.

* cited by examiner

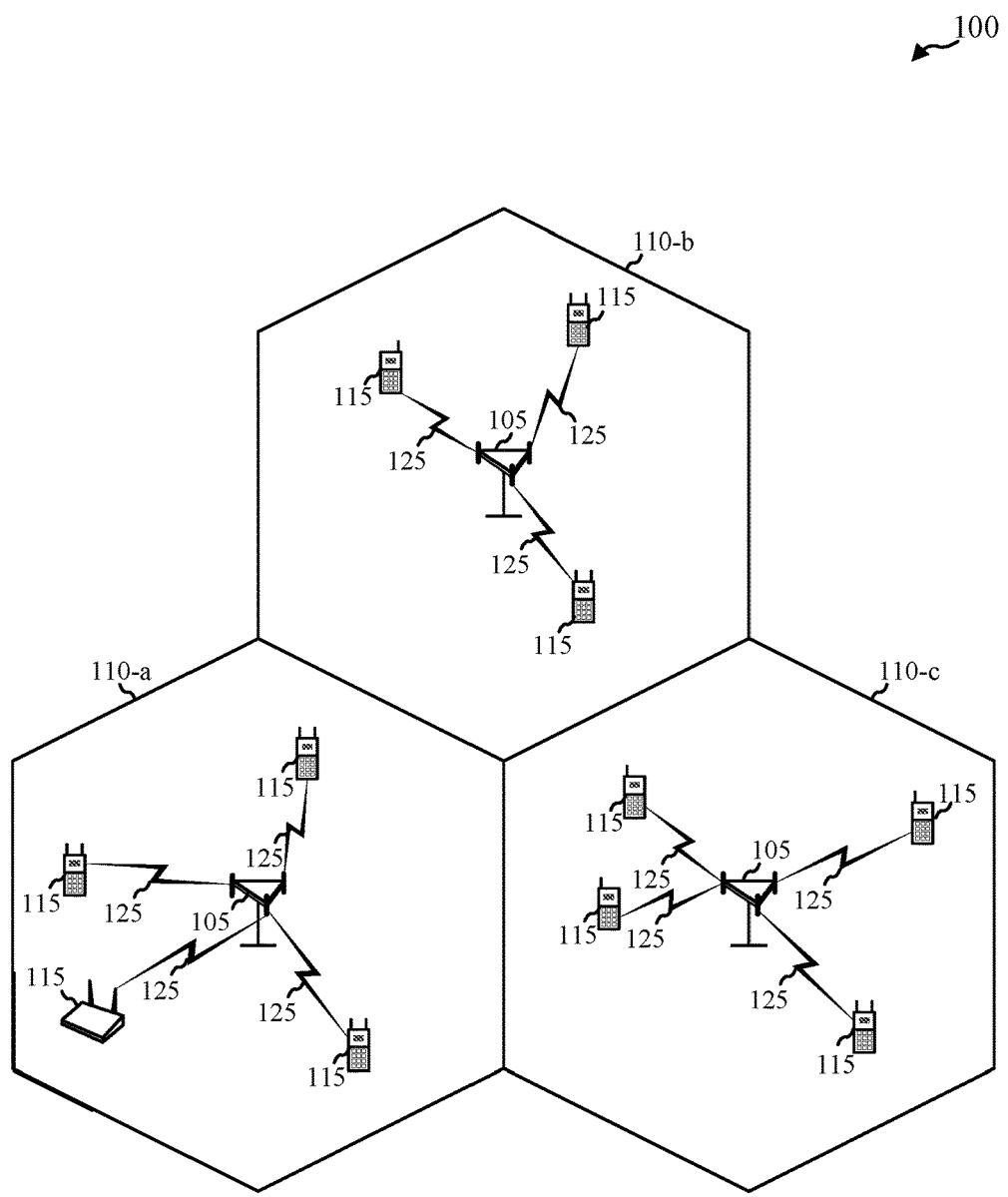
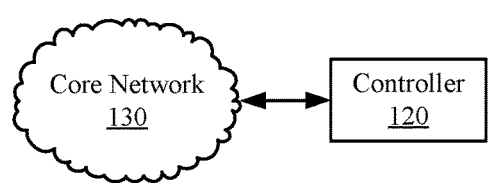
FIG. 1

| Cases | Handover/Reselection Scenario 510 | Deployment Scenarios 520 |
|---|---|---|
| Case 1 | UE may move from Carrier A with N = x to Carrier B with N = x, x ≠ 1 (e.g., same flexible bandwidth carrier) | Inter-Frequency Intra-Frequency |
| Case 2 | UE may move from Carrier A with N = x to Carrier B with N = y, y & x ≠ 1, y ≠ x (e.g., different flexible bandwidth carrier) | Inter-Frequency |
| Case 3 | UE moves from Carrier A with N ≠ 1 to Carrier B with N = 1 (e.g., flexible to normal bandwidth carrier) | Inter-Frequency |
| Case 4 | UE moves from Carrier A with N = 1 to Carrier B with N ≠ 1 (e.g., normal to flexible bandwidth carrier) | Inter-Frequency |
| Case 5 | UE moves from Carrier A (e.g., GSM) to Carrier B with N≠1 (e.g., GSM to flexible bandwidth carrier) | Inter-RAT |
| Case 6 | UE moves from Carrier A with N ≠ 1 to Carrier B (e.g., GSM) (e.g., flexible bandwidth carrier to GSM) | Inter-RAT |

FIG. 5

BANDWIDTH INFORMATION DETERMINATION FOR FLEXIBLE BANDWIDTH CARRIERS

CLAIM OF PRIORITY

The present Application for Patent is a Divisional of patent application Ser. No. 13/670,308 entitled "BANDWIDTH INFORMATION DETERMINATION FOR FLEXIBLE BANDWIDTH CARRIERS" filed Nov. 6, 2012, which in turn claims priority to Provisional Application No. 61/556,777 entitled "FRACTIONAL SYSTEMS IN WIRELESS COMMUNICATIONS" filed Nov. 7, 2011, and also claims priority to Provisional Application No. 61/568,742 entitled "SIGNAL CAPACITY BOOSTING, COORDINATED FORWARD LINK BLANKING AND POWER BOOSTING, AND REVERSE LINK THROUGHPUT INCREASING FOR FLEXIBLE BANDWIDTH SYSTEMS" filed Dec. 9, 2011, and further claims priority to Provisional Application No. 61/607,502 entitled "MOBILITY MANAGEMENT FOR FLEXIBLE BANDWIDTH SYSTEMS AND DEVICES" filed Mar. 6, 2012, each of which is assigned to the assignee hereof and is hereby expressly incorporated by reference herein in its entirety.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, 3GPP Long Term Evolution (LTE) systems, and orthogonal frequency-division multiple access (OFDMA) systems.

Service providers are typically allocated blocks of frequency spectrum for exclusive use in certain geographic regions. These blocks of frequencies are generally assigned by regulators regardless of the multiple access technology being used. In most cases, these blocks are not integer multiple of channel bandwidths, hence there may be unutilized parts of the spectrum. As the use of wireless devices has increased, the demand for and value of this spectrum has generally surged, as well. Nonetheless, in some cases, wireless communications systems may not utilize portions of the allocated spectrum because the portions are not big enough to fit a standard or normal waveform. The developers of the LTE standard, for example, recognized the problem and decided to support 6 different system bandwidths, namely 1.4, 3, 5, 10, 15 and 20 MHz. Another approach may be to utilize flexible bandwidth carrier systems that may involve wireless communications systems that utilize portions of spectrum that may not fit a normal waveform. However, different mobility management issues may arise when utilizing flexible bandwidth carrier systems, such as facilitating migration between mixed legacy and flexible bandwidth carrier systems, or even other flexible bandwidth carrier systems.

SUMMARY

Methods, systems, and devices for wireless communications systems that utilize flexible bandwidth are provided. Some embodiments provide mobility management for mixed legacy and flexible bandwidth systems. Some embodiments include approaches for determining bandwidth information, such as a bandwidth scaling factor N and/or flexible bandwidth, at a user equipment (UE). In some cases, the bandwidth information may not be signaled to a UE. As a result, the UE may have to determine which bandwidth information hypotheses to use in acquiring and decoding information on the cell, which may be a flexible bandwidth cell, though may be a normal bandwidth (i.e., N=1) cell in some cases. Different approaches may be utilized in determining bandwidth information including, but not limited to: random ordered bandwidth scaling factor approaches, delay ordered bandwidth scaling factor approaches, stored bandwidth scaling factor value in UE Neighbor Record approaches, spectrum measurement approaches, spectrum calculation approaches, and/or a priori approaches. Other approaches may include a mapping of frequency to bandwidth scaling factor (e.g., in a searching mechanism). These approaches may also be based on flexible bandwidths rather than bandwidth scaling factors.

Flexible bandwidth carrier systems may involve wireless communications systems that may utilize portions of spectrum that may not be big enough to fit a normal waveform through utilizing flexible waveforms. A flexible bandwidth carrier system may be generated with respect to a normal bandwidth carrier system through dilating a frame length or scaling down a chip rate of the flexible bandwidth carrier system with respect to the normal bandwidth carrier system, for example. In some embodiments, a flexible bandwidth carrier system may be generated with respect to a normal bandwidth carrier system through dilating the frame lengths, or scaling down, the bandwidth of the flexible bandwidth carrier system with respect to the normal bandwidth carrier system. Some embodiments increase the bandwidth of a flexible waveform through expanding, or scaling up a chip rate of the flexible bandwidth carrier system. Some embodiments increase the bandwidth of a flexible waveform through decreasing the frame lengths, or scaling up the bandwidth of the flexible bandwidth carrier system.

Some embodiments include a method for wireless communications that may include: interpreting, at a user equipment (UE), a first set of received data; and/or determining, at the UE utilizing the first set of received data, a bandwidth information associated with a flexible bandwidth carrier, the bandwidth information comprising a second set of data different from the first set of data in that the second set of data includes the bandwidth information.

The bandwidth information may include at least a bandwidth scaling factor or a bandwidth associated with the flexible bandwidth carrier. Some embodiments include utilizing, at the UE, the determined bandwidth information associated with the flexible bandwidth carrier to facilitate mobility management with respect to the flexible bandwidth carrier.

Determining the bandwidth information associated with the flexible bandwidth carrier may include utilizing a sequence of bandwidth scaling factors to determine a bandwidth scaling factor associated with the flexible bandwidth carrier. The sequence of bandwidth scaling factors may include a random sequence of bandwidth scaling factors. The sequence of bandwidth scaling factors may include a pre-determined sequence of bandwidth scaling factors. The pre-determined sequence may include a sequence of increasing bandwidth scaling factors. The pre-determined sequence may include a sequence of bandwidth scaling factors starting with a current bandwidth scaling factor of a cell sending the first set of received data. The sequence of bandwidth scaling factors may be at least determined by the UE and stored for subsequent use, set by a manufacturer, set by an operator, or set in a SIM. Utilizing the pre-determined sequence of bandwidth scaling factors may include utilizing one or more cell search and blind decodes of a flexible bandwidth cell based on the bandwidth scaling factors from the pre-determined sequence.

Determining the bandwidth information associated with the flexible bandwidth carrier may include utilizing a stored bandwidth scaling factor to determine the bandwidth information associated with the flexible bandwidth carrier. Determining the bandwidth information associated with the flexible bandwidth carrier may include utilizing one or more spectrum measurements to determine the bandwidth information associated with the flexible bandwidth carrier. Determining the bandwidth information associated with the flexible bandwidth carrier may include utilizing one or more spectrum calculations to determine the bandwidth information associated with the flexible bandwidth carrier. Determining the bandwidth information associated with the flexible bandwidth carrier may include utilizing a priori information regarding one or more bandwidth scaling factors of the flexible bandwidth carrier to determine the bandwidth information associated with the flexible bandwidth carrier.

Determining the bandwidth information associated with the flexible bandwidth carrier may include utilizing a priori information regarding the probability of deploying one or more flexible bandwidth carriers with one or more bandwidth scaling factors in a given area to determine the bandwidth information associated with the flexible bandwidth carrier. The a priori information may be at least transmitted to the UE, calculated at the UE and used subsequently, or provided to the UE through a SIM. In some embodiments, the bandwidth information depends upon a location.

Determining the bandwidth information associated with the flexible bandwidth carrier may include utilizing a priori information regarding the probability of deploying one or more flexible bandwidth carriers with one or more bandwidth scaling factors in a given area combined with a pre-determined sequence of bandwidth scaling factors to determine the bandwidth information associated with the flexible bandwidth carrier.

Facilitating mobility management may include facilitating mobility between the one of more flexible bandwidth carriers and another flexible bandwidth carrier, wherein the flexible bandwidth carriers utilize the same bandwidth scaling factor. Facilitating mobility management may include facilitating mobility between the one of more flexible bandwidth carriers and another flexible bandwidth carrier, wherein the flexible bandwidth carriers utilize different bandwidth scaling factors. Facilitating mobility management may include facilitating mobility between the one of more flexible bandwidth carriers and normal bandwidth carrier.

Some embodiments include a wireless communications system. The system may include: means for interpreting, at a user equipment (UE), a first set of received data; and/or means for determining, at the UE utilizing the first set of received data, a bandwidth information associated with a flexible bandwidth carrier, the bandwidth information comprising a second set of data different from the first set of data in that the second set of data includes the bandwidth information.

The wireless communications system may include means for utilizing, at the UE, the determined bandwidth information associated with the flexible bandwidth carrier to facilitate mobility management with respect to the flexible bandwidth carrier.

The means for determining the bandwidth information associated with the flexible bandwidth carrier may include means for utilizing a random sequence of bandwidth scaling factors to determine the bandwidth information associated with the flexible bandwidth carrier. The means for determining the bandwidth information associated with the flexible bandwidth carrier may include means for utilizing a pre-determined sequence of bandwidth scaling factors to determine the bandwidth information associated with the flexible bandwidth carrier. The pre-determined sequence may include a sequence of increasing bandwidth scaling factors. The pre-determined sequence may include a sequence of bandwidth scaling factors starting with a current bandwidth scaling factor of a cell sending the first set of received data. The means for utilizing the pre-determined sequence of bandwidth scaling factors may include means for utilizes one or more cell search and blind decodes of a flexible bandwidth cell based on the bandwidth scaling factors from the pre-determined sequence.

The means for determining the bandwidth information associated with the flexible bandwidth carrier may include means for utilizing a stored bandwidth scaling factor to determine the bandwidth information associated with the flexible bandwidth carrier. The means for determining the bandwidth information associated with the flexible bandwidth carrier may include means for utilizing one or more spectrum measurements to determine the bandwidth information associated with the flexible bandwidth carrier. The means for determining the bandwidth information associated with the flexible bandwidth carrier may include means for utilizing one or more spectrum calculations to determine the bandwidth information associated with the flexible bandwidth carrier. The means for determining the bandwidth information associated with the flexible bandwidth carrier may include means for utilizing a priori information regarding one or more bandwidth scaling factors of the flexible bandwidth carrier to determine the bandwidth scaling factor associated with the flexible bandwidth carrier. The means for determining the bandwidth information associated with the flexible bandwidth carrier may include means for utilizing a priori information regarding the probability of deploying one or more flexible bandwidth carriers with one or more bandwidth scaling factors in a given area to determine the bandwidth information associated with the flexible bandwidth carrier.

Some embodiments include a computer program product for wireless communications systems that may include a non-transitory computer-readable medium that may include: code for interpreting, at a user equipment (UE), a first set of received data; and/or code for determining, at the UE utilizing the first set of received data, a bandwidth information associated with a flexible bandwidth carrier, the bandwidth information comprising a second set of data different from the first set of data in that the second set of data includes the bandwidth information.

The non-transitory computer-readable medium may further include code for utilizing, at the UE, the determined bandwidth information associated with the flexible bandwidth carrier to facilitate mobility management with respect to the flexible bandwidth carrier. The code for determining the bandwidth information associated with the flexible bandwidth carrier may include code for utilizing a random sequence of bandwidth scaling factors to determine the bandwidth information associated with the flexible bandwidth carrier. The code for determining the bandwidth information associated with the flexible bandwidth carrier may include code for utilizing a pre-determined sequence of bandwidth scaling factors to determine the bandwidth information associated with the flexible bandwidth carrier. The pre-determined sequence may include a sequence of increasing bandwidth scaling factors. The pre-determined sequence may include a sequence of bandwidth scaling factors starting with a current bandwidth scaling factor of a cell sending the first set of received data. The code for utilizing the pre-determined sequence of bandwidth scaling factors may include code for utilizes one or more cell search and blind decodes of a flexible bandwidth cell based on the bandwidth scaling factors from the pre-determined sequence.

The code for determining the bandwidth information associated with the flexible bandwidth carrier may include code for utilizing a stored bandwidth information to determine the bandwidth information associated with the flexible bandwidth carrier. The code for determining the bandwidth information associated with the flexible bandwidth carrier may include code for utilizing one or more spectrum measurements to determine the bandwidth information associated with the flexible bandwidth carrier. The code for determining the bandwidth information associated with the flexible bandwidth carrier may include code for utilizing one or more spectrum calculations to determine the bandwidth information associated with the flexible bandwidth carrier. The code for determining the bandwidth information associated with the flexible bandwidth carrier may include code for utilizing a priori information regarding one or more bandwidth scaling factors of the flexible bandwidth carrier to determine the bandwidth information associated with the flexible bandwidth carrier. The code for determining the bandwidth information associated with the flexible bandwidth carrier may include code for utilizing a priori information regarding the probability of deploying one or more flexible bandwidth carriers with one or more bandwidth scaling factors in a given area to determine the bandwidth information associated with the flexible bandwidth carrier.

Some embodiments include a wireless communications device that may include at least one processor that may be configured to: interpret, at a user equipment (UE), a first set of received data; and/or determine, at the UE utilizing the first set of received data, a bandwidth information associated with a flexible bandwidth carrier, the bandwidth information comprising a second set of data different from the first set of data in that the second set of data includes the bandwidth information. The wireless communications device may also include at least one memory coupled with the at least one processor.

The at least one processor may be further configured to utilize, at the UE, the determined bandwidth information associated with the flexible bandwidth carrier to facilitate mobility management with respect to the flexible bandwidth carrier. The at least one processor configured to determine the bandwidth information associated with the flexible bandwidth carrier may be configured to utilize a random sequence of bandwidth scaling factors to determine the bandwidth information associated with the flexible bandwidth carrier. The at least one processor configured to determine the bandwidth information associated with the flexible bandwidth carrier may be configured to utilize a pre-determined sequence of bandwidth scaling factors to determine the bandwidth information associated with the flexible bandwidth carrier. The pre-determined sequence may include a sequence of increasing bandwidth scaling factors. The pre-determined sequence may include a sequence of bandwidth scaling factors starting with a current bandwidth scaling factor of a cell sending the first set of received data.

The at least one processor configured to utilizing the pre-determined sequence of bandwidth scaling factors may be configured to utilize one or more cell search and blind decodes of a flexible bandwidth cell based on the bandwidth scaling factors from the pre-determined sequence. The at least one processor configured to determine the bandwidth information associated with the flexible bandwidth carrier may be configured to utilize a stored bandwidth information to determine the bandwidth information associated with the flexible bandwidth carrier. The at least one processor configured to determine the bandwidth information associated with the flexible bandwidth carrier may be configured to utilize one or more spectrum measurements to determine the bandwidth information associated with the flexible bandwidth carrier. The at least one processor configured to determine the bandwidth information associated with the flexible bandwidth carrier may be configured to utilize one or more spectrum calculations to determine the bandwidth information associated with the flexible bandwidth carrier. The at least one processor configured to determine the bandwidth information associated with the flexible bandwidth carrier may be configured to utilize a priori information regarding one or more bandwidth scaling factors of the flexible bandwidth carrier to determine the bandwidth information associated with the flexible bandwidth carrier. The at least one processor configured to determine the bandwidth information associated with the flexible bandwidth carrier may be configured to utilize a priori information regarding the probability of deploying one or more flexible bandwidth carriers with one or more bandwidth scaling factors in a given area to determine the bandwidth information associated with the flexible bandwidth carrier. The at least one processor configured to determine the bandwidth information associated with the flexible bandwidth carrier may be configured to utilize a priori information regarding the probability of deploying one or more flexible bandwidth carriers with one or more bandwidth scaling factors in a given area combined with a pre-determined sequence of bandwidth scaling factors to determine the bandwidth information associated with the flexible bandwidth carrier.

In some embodiments, facilitating mobility management includes facilitating mobility between the one of more flexible bandwidth carriers and another flexible bandwidth carrier, wherein the flexible bandwidth carriers utilize the same bandwidth information to determine the bandwidth information associated with the flexible bandwidth carrier. Facilitating mobility management may include facilitating mobility between the one of more flexible bandwidth carriers and another flexible bandwidth carrier, wherein the flexible bandwidth carriers utilize different bandwidth scaling factors to determine the bandwidth information associated with the flexible bandwidth carrier. Facilitating mobility management may include facilitating mobility between the one of more flexible bandwidth carriers and normal bandwidth carrier to determine the bandwidth information associated with the flexible bandwidth carrier.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 1 shows a block diagram of a wireless communications system in accordance with various embodiments;

FIG. 5 shows a table that includes several mobility management scenarios in accordance with various embodiments;

DETAILED DESCRIPTION

Figure 2A:
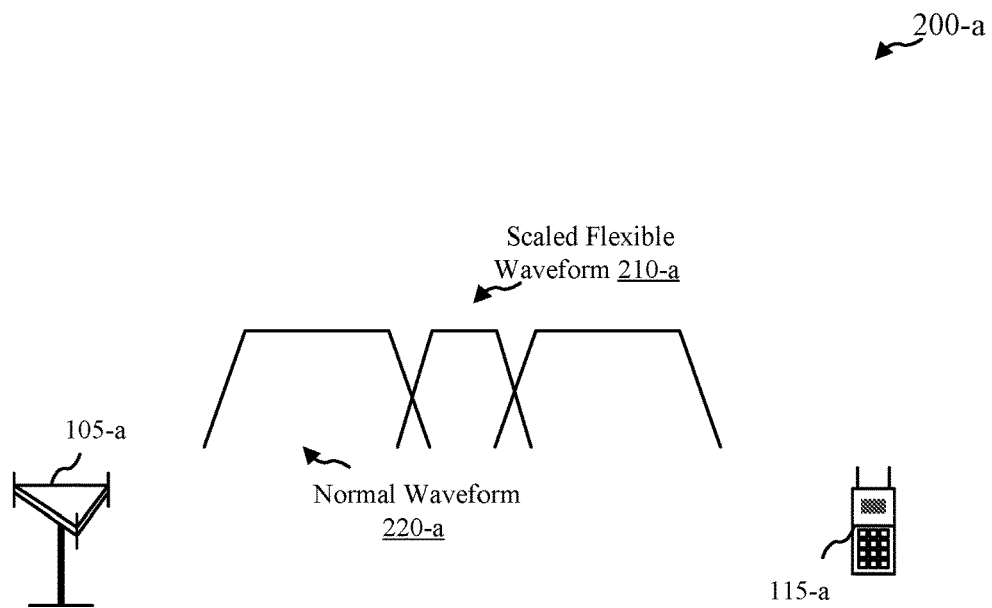
FIG. 2A shows an example of a wireless communications system where a flexible waveform fits into a portion of spectrum not broad enough to fit a normal waveform in accordance with various embodiments.

Methods, systems, and devices for wireless communications systems that utilize flexible bandwidth are provided. Some embodiments provide mobility management for mixed legacy and flexible bandwidth systems. Some embodiments include approaches for determining bandwidth information, such as a bandwidth scaling factor N and/or a flexible bandwidth, at a user equipment (UE). In some cases, the bandwidth information may not be signaled to a UE. As a result, the UE may have to determine which bandwidth information hypotheses to use in acquiring and decoding information on the cell, which may be a flexible bandwidth cell, though may be a normal bandwidth (i.e., N=1) cell in some cases. Different approaches may be utilized in determining bandwidth information including, but not limited to: random ordered bandwidth scaling factor approaches, delay ordered bandwidth scaling factor approaches, stored bandwidth scaling factor value in UE Neighbor Record approaches, spectrum measurement approaches, spectrum calculation approaches, and/or a priori approaches. Other approaches may include a mapping of frequency to bandwidth scaling factor (e.g., in a searching mechanism). These different approaches may be done in parallel or serially in some cases. These different approaches may also be combined. These approaches may also be based on flexible bandwidths rather than bandwidth scaling factors.

Some embodiments include one or more flexible bandwidth carrier networks that may be designed for low data rate applications and may be used also in soft re-framing scenarios. In a mixed legacy and flexible bandwidth carrier deployment (e.g., GSM, UMTS, and flexible bandwidth carrier networks), multi-mode flexible bandwidth UEs may be able to migrate between these networks. Embodiments address different issues that may arise in these mixed systems including, but not limited to: the impacts of the mobility management procedure with respect to deploying a flexible bandwidth carrier or cell in network with existing systems, such as UMTS or GSM; and/or network signaling of information about a flexible bandwidth carrier or cell to flexible bandwidth UEs.

Flexible bandwidth carrier systems may involve wireless communications systems that may utilize portions of spectrum that may not be big enough to fit a normal waveform utilizing flexible waveforms. A flexible bandwidth carrier system may be generated with respect to a normal bandwidth carrier system through dilating the frame length, or scaling down, a chip rate of the flexible bandwidth carrier system with respect to the normal bandwidth carrier system, for example. In some embodiments, a flexible bandwidth carrier system may be generated with respect to a normal bandwidth carrier system through dilating the frame lengths, or scaling down, the bandwidth of the flexible bandwidth carrier system with respect to the normal bandwidth carrier system. Some embodiments increase the bandwidth of a flexible waveform through expanding, or scaling up the chip rate of the flexible bandwidth carrier system. Some embodiments increase the bandwidth of a flexible waveform through decreasing the frame lengths, or scaling up the bandwidth of the flexible bandwidth carrier system.

Techniques described herein may be used for various wireless communications systems such as CDMA, TDMA, FDMA, OFDMA, SC-FDMA, Peer-to-Peer, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X,1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA or OFDM system may implement a radio technology such as Ultra Mobile Broadband (UMB), Evolved UTRA (E-UTRA), IEEE 802.11 (Wi-Fi), IEEE 802.16 (Wi-MAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a block diagram illustrates an example of a wireless communications system 100 in accordance with various embodiments. The system 100 includes base stations 105, user equipment 115, a base station controller 120, and a core network 130 (the controller 120 may be integrated into the core network 130 in some embodiments; in some embodiments, controller 120 may be integrated into base stations 105). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, Time Division Multiple Access (TDMA) signal, Frequency Division Multiple Access (FDMA) signal, Orthogonal FDMA (OFDMA) signal, Single-Carrier FDMA (SC-FDMA) signal, etc. Each modulated signal may be sent on a different carrier and may carry control information (e.g., pilot signals), overhead information, data, etc. The system 100 may be a multi-carrier LTE network capable of efficiently allocating network resources.

The user equipment 115 may be any type of mobile station, mobile device, access terminal, subscriber unit, or user equipment. The user equipment 115 may include cellular phones and wireless communications devices, but may also include personal digital assistants (PDAs), smartphones, other handheld devices, netbooks, notebook computers, etc. Thus, the term user equipment should be interpreted broadly hereinafter, including the claims, to include any type of wireless or mobile communications device.

The base stations 105 may wirelessly communicate with the user equipment 115 via a base station antenna. The base stations 105 may be configured to communicate with the user equipment 115 under the control of the controller 120 via multiple carriers. In GSM, for example, the controller 120 may be referred to as the base station controller (BSC); in UMTS, the controller may be known as the Radio Network Controller (RNC). Each of the base station 105 sites can provide communication coverage for a respective geographic area. In some embodiments, base stations 105 may be referred to as a NodeB, eNodeB, Home NodeB, and/or Home eNodeB. The coverage area for each base station 105 here is identified as 110-a, 110-b, or 110-c. The coverage area for a base station may be divided into sectors (not shown, but making up only a portion of the coverage area). The system 100 may include base stations 105 of different types (e.g., macro, micro, femto, and/or pico base stations).

The different aspects of system 100, such as the user equipment 115, the base stations 105, the core network 130, and/or the controller 120 may be configured to utilize flexible bandwidth carriers and waveforms in accordance with various embodiments. System 100, for example, shows transmissions 125 between user equipment 115 and base stations 105. The transmissions 125 may include uplink and/or reverse link transmission, from a user equipment 115 to a base station 105, and/or downlink and/or forward link transmissions, from a base station 105 to a user equipment 115. The transmissions 125 may include flexible and/or normal waveforms. Normal waveforms may also be referred to as legacy and/or normal waveforms.

The different aspects of system 100, such as the user equipment 115, the base stations 105, the core network 130, and/or the controller 120 may be configured to utilize flexible bandwidth and waveforms in accordance with various embodiments. For example, different aspects of system 100 may utilize portions of spectrum that may not be big enough to fit a normal waveform. Devices such as the user equipment 115, the base stations 105, the core network 130, and/or the controller 120 may be configured to adapt the chip rates and/or scaling factors to generate and/or utilize flexible bandwidth and/or waveforms. Some aspects of system 100 may form a flexible subsystem (such as certain user equipment 115 and/or base stations 105) that may be generated with respect to a normal subsystem (that may be implemented using other user equipment 115 and/or base stations 105) through dilating, or scaling down, the time or the chip rate of the flexible bandwidth carrier system with respect to the normal bandwidth carrier system. In some embodiments, a flexible subsystem may be generated with respect to a normal subsystem through dilating the frame lengths, or scaling down, the bandwidth of the flexible subsystem with respect to the normal subsystem. Some embodiments increase the bandwidth of a flexible waveform through expanding, or scaling up the time or the chip rate of the flexible subsystem. Some embodiments increase the bandwidth of a flexible waveform through decreasing the frame lengths, or scaling up the bandwidth of the flexible subsystem.

In some embodiments, the different aspects of system 100, such as the user equipment 115 may be configured for determining bandwidth information, such as one or more bandwidth scaling factors N and/or bandwidths, which may also be referred to as scaling factors or flexible scaling factor or flexible bandwidths, at the UE 115. Different approaches may be utilized in determining bandwidth information including, but not limited to: random ordered N approaches, delay ordered N approaches, stored N value in UE Neighbor Record approaches, spectrum measurement approaches, spectrum calculation approaches, and/or a priori approaches. Information regarding the bandwidth scaling factor and/or bandwidths may be stored in other areas, including multiple areas. Other approaches may include a mapping of frequency to bandwidth scaling factor and/or a bandwidth (e.g., in a searching mechanism). These different approaches may be done in parallel or serially in some cases. These different approaches may also be combined. In some cases, information such as a flexible bandwidth itself may be stored rather than a bandwidth scaling factor for the flexible bandwidth. Some embodiments include interpreting a first set of received data at a UE 115. Bandwidth information associated with a flexible bandwidth carrier may be determined at the UE 115 utilizing the first set of received data. The flexible bandwidth carrier may be utilized by one of the base stations 105, for example. The bandwidth information may include a second set of data different from the first set of data in that the second set of data includes the bandwidth information. Determining the bandwidth information at the UE 115 may facilitate mobility management with respect to a flexible bandwidth carrier that may also utilize the determined bandwidth information. The bandwidth information may include least a bandwidth scaling factor or a bandwidth associated with the flexible bandwidth carrier.

Some embodiments may include user equipment 115 and/or base stations 105 that may generate flexible waveforms and/or normal waveforms. Flexible waveforms may occupy less bandwidth than a normal waveform. For example, at a band edge, there may not be enough available spectrum to place a normal waveform. For a flexible waveform in some embodiments, as time (e.g., frame length) gets dilated, the frequency occupied by a waveform goes down, thus making it possible to fit a flexible waveform into spectrum that may not be broad enough to fit a normal waveform. Flexible waveforms may also be generated in some embodiments through using a scaling factor. In some embodiments, a flexible bandwidth carrier may be utilized to carry the flexible waveform. Other embodiments may generate a flexible waveform to fit a portion of spectrum through altering a rate or chip rate (e.g., a spreading factor may change). Some embodiments may change a frequency of processing to change a chip rate or utilize a scaling factor. Changing frequency of processing may include changing an interpolation rate, an interrupt rate, and/or a decimation rate. In some embodiments, a chip rate may be changed or a scaling factor utilized through filtering, by decimation, and/or by changing a frequency of an ADC, a DAC, and/or an offline clock. A divider may be used to change the frequency of at least one clock. In some embodiments, a chip rate divider (Dcr) may be utilized. In some embodiments, a scaling factor for a flexible bandwidth carrier may be referred to as a bandwidth scaling factor.

In some embodiments, a flexible system or waveform may be a fractional system or waveform. Fractional systems and/or waveforms may or may not change bandwidth for example. A fractional system or waveform may be flexible because it may offer more possibilities than a normal system or waveform (e.g., N=1 system). A normal system or waveform may refer to a standard and/or legacy system or waveform.

Figure 2B:
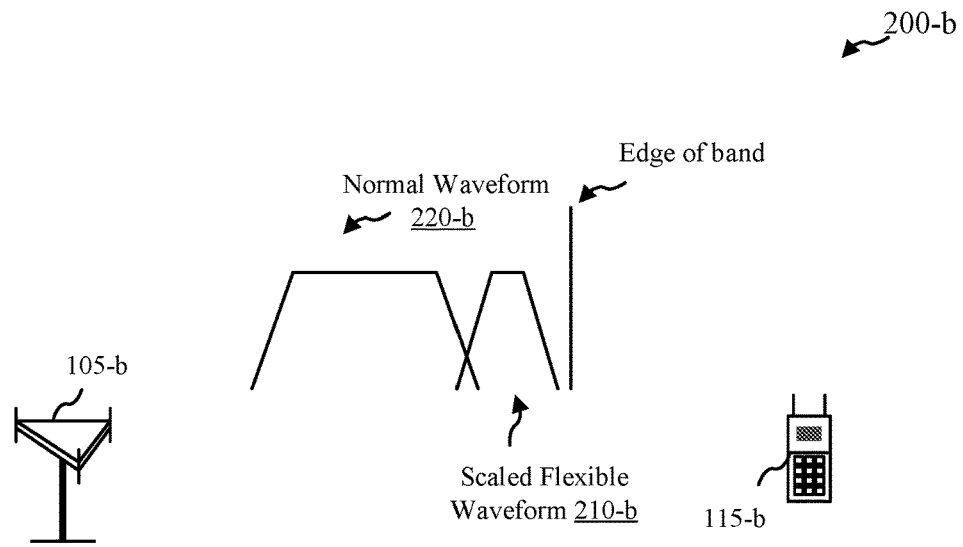
FIG. 2B shows an example of a wireless communications system where a flexible waveform fits into a portion of spectrum near an edge of a band in accordance with various embodiments.

FIG. 2A shows an example of a wireless communications system 200-a with a base station 105-a and a user equipment 115-a in accordance with various embodiments, where a flexible waveform 210-a fits into a portion of spectrum not broad enough to fit a normal waveform 220-a. System 200-a may be an example of system 100 of FIG. 1. In some embodiments, the flexible waveform 210-a may overlap with the normal waveform 220-a that either the base 105-a and/or the user equipment 115-a may transmit. Some embodiments may also utilize multiple flexible waveforms 210. In some embodiments, another base station and/or user equipment (not shown) may transmit the normal waveform 220-a and/or the flexible waveform 210-a. FIG. 2B shows an example of a wireless communications system 200-b with a base station 105-b and user equipment 115-b, where a flexible waveform 210-b fits into a portion of spectrum near an edge of a band, which may be a guard band, where normal waveform 220-b may not fit. System 200-b may be an example of system 100 of FIG. 1.

In some embodiments, the user equipment 115-a and/or 115-b are configured for determining bandwidth information associated with a flexible bandwidth carrier, such as a bandwidth scaling factor N and/or a flexible bandwidth. Different approaches may be utilized in determining N including, but not limited to: random ordered N approaches, delay ordered N approaches, stored N value in UE Neighbor Record approaches, spectrum measurement approaches, spectrum calculation approaches, and/or a priori approaches. Some embodiments include interpreting a first set of received data at user equipment 115-a and/or 115-b. The bandwidth information associated with a flexible bandwidth carrier may be determined at the UE utilizing the first set of received data. The bandwidth information may include a second set of data different from the first set of data in that the second set of data includes the bandwidth information. Determining the bandwidth information at the user equipment 115-a and/or 115-b may facilitate mobility management with respect to a flexible bandwidth carrier that may also utilize the determined bandwidth information. The bandwidth information may include least a bandwidth scaling factor or a bandwidth associated with the flexible bandwidth carrier.

Figure 3:
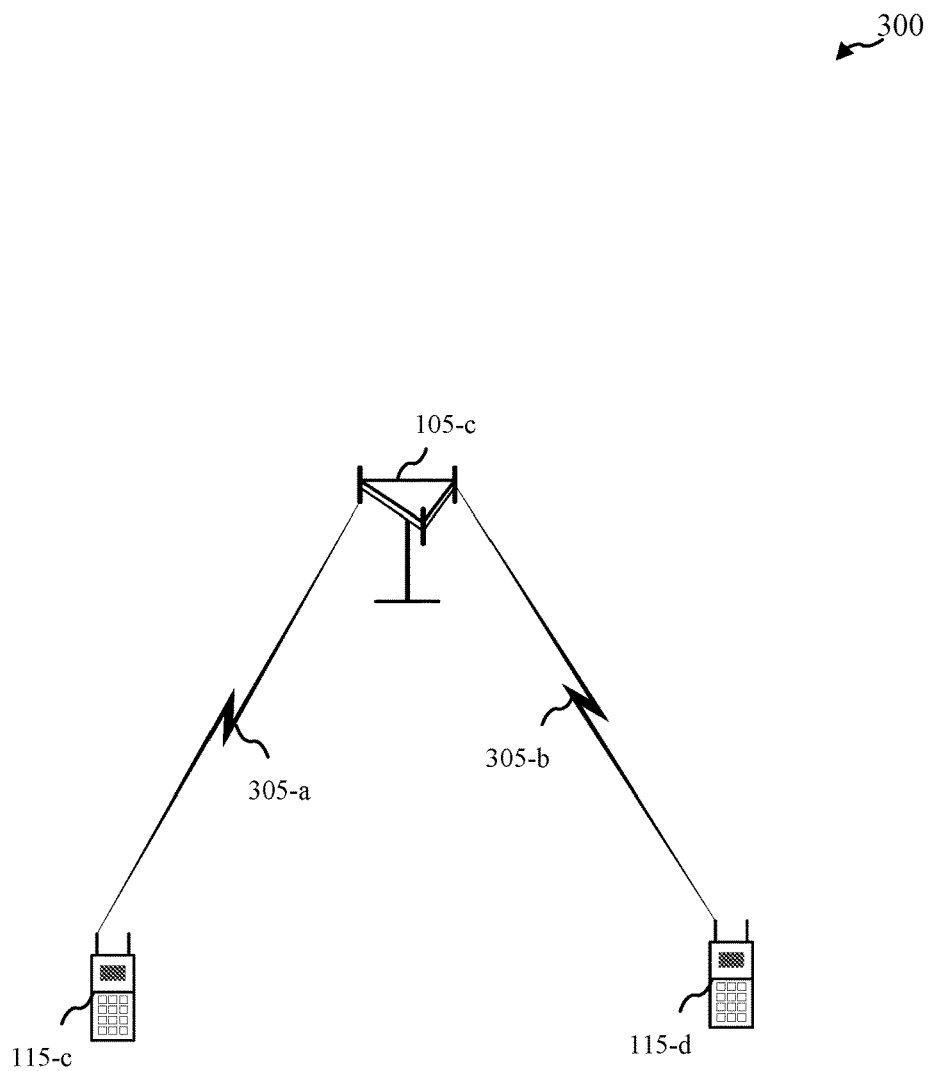
FIG. 3 shows a block diagram of a wireless communications system in accordance with various embodiments.

FIG. 3 shows a wireless communications system 300 with base stations 105-c and user equipment 115-c and 115-d, in accordance with various embodiments. Some embodiments include interpreting a first set of received data at user equipment 115-c and/or 115-d. Transmissions 305-a and/or 305-b between the user equipment 115-c and/or 115-d and the base station 105-c may be utilized to provide the data to user equipment 115-c and/or 115-d. A bandwidth information associated with a flexible bandwidth carrier may be determined at user equipment 115-c and/or 115-d utilizing the first set of received data. The bandwidth information may include a second set of data different from the first set of data in that the second set of data includes the bandwidth information. Determining the bandwidth information at the UE may facilitate mobility management with respect to a flexible bandwidth carrier that may also utilize the determined bandwidth information. The bandwidth information may include least a bandwidth scaling factor or a bandwidth associated with the flexible bandwidth carrier.

Transmissions 305-a and/or 305-b between the user equipment 115-c and/or 115-d and the base station 105-c may utilize flexible waveforms that may be generated to occupy less (or more) bandwidth than a normal waveform. For example, at a band edge, there may not be enough available spectrum to place a normal waveform. For a flexible waveform, as time gets dilated, the frequency occupied by a waveform goes down, thus making it possible to fit a flexible waveform into spectrum that may not be broad enough to fit a normal waveform. In some embodiments, the flexible waveform may be scaled utilizing a scaling factor N with respect to a normal waveform. Scaling factor N may be referred to as a bandwidth scaling factor. Scaling factor N may be utilized to scaling a bandwidth for a flexible bandwidth carrier. Scaling factor N may take on numerous different values including, but not limited to, integer values such as 1, 2, 3, 4, 8, etc. N, however, does not have to be an integer. In some cases, a chip rate divider (Dcr) may be utilized, which may have the same numerical value as a bandwidth scaling factor. Merely by way of example, a flexible bandwidth system with N=2 may occupy half the bandwidth of a normal bandwidth system or flexible bandwidth system with N=1.

Some embodiments include utilizing, at the user equipment 115-c and/or 115-d, the determined bandwidth information associated with the flexible bandwidth carrier to facilitate mobility management with respect to the flexible bandwidth carrier. Facilitating mobility management may include facilitating mobility between the one of more flexible bandwidth carriers and another flexible bandwidth carrier, where the flexible bandwidth carriers utilize the same information, such as the same bandwidth scaling factor and/or the same flexible bandwidth. Facilitating mobility management may include facilitating mobility between the one of more flexible bandwidth carriers and another flexible bandwidth carrier, where the flexible bandwidth carriers utilize different information, such as different bandwidth scaling factors and/or different flexible bandwidths. Facilitating mobility management may include facilitating mobility between the one of more flexible bandwidth carriers and normal bandwidth carrier.

Determining, at user equipment 115-c and/or 115-d, the bandwidth information associated with the flexible bandwidth carrier may include utilizing a random sequence of bandwidth scaling factors to determine the bandwidth information associated with the flexible bandwidth carrier. Determining the bandwidth information associated with the flexible bandwidth carrier may include utilizing a pre-determined sequence of bandwidth scaling factors to determine the bandwidth information associated with the flexible bandwidth carrier. The pre-determined sequence may include a sequence of increasing bandwidth scaling factors. The pre-determined sequence may include a sequence of bandwidth scaling factors starting with a current bandwidth scaling factor of a cell sending the first set of received data. Utilizing the pre-determined sequence of bandwidth scaling factors may utilize one or more cell search and blind decodes based on the bandwidth scaling factors from the pre-determined sequence.

Determining, at user equipment 115-c and/or 115-d, the bandwidth information associated with the flexible bandwidth carrier may include utilizing a stored bandwidth scaling factor. Determining the bandwidth information associated with the flexible bandwidth carrier may include utilizing one or more spectrum measurements. Determining the bandwidth information associated with the flexible bandwidth carrier may include utilizing one or more spectrum calculations.

Determining, at user equipment 115-c and/or 115-d, the bandwidth information associated with the flexible bandwidth carrier may include utilizing a priori information regarding one or more bandwidth scaling factors of the flexible bandwidth carrier. Determining the bandwidth information associated with the flexible bandwidth carrier may include utilizing a priori information regarding the probability of deploying one or more flexible bandwidth carriers with one or more bandwidth scaling factors in a given area. Determining the bandwidth information associated with the flexible bandwidth carrier may include utilizing a priori information regarding the probability of deploying one or more flexible bandwidth carriers with one or more bandwidth scaling factors in a given area combined with the delay ordered scaling factor approach.

Some embodiments may utilize additional terminology. A new unit D may be utilized. The unit D may be "dilated". The unit is unitless and has the value of N. One can talk about time in the flexible system in terms of "dilated time". For example, a slot of say 10 ms in normal time may be represented as 10 Dms in flexible time (note: even in normal time, this will hold true since N=1 in normal time: D has a value of 1, so 10 Dms=10 ms). In time scaling, one can replace most "seconds" with "dilated-seconds".

As discussed above, a flexible waveform may be a waveform that occupies less, or more, bandwidth than a normal waveform. Thus, in a flexible bandwidth carrier system, the same number of symbols and bits may be transmitted over a longer duration compared to a normal bandwidth system. This may result in time stretching, whereby slot duration, frame duration, etc., may increase by a scaling factor N. Scaling factor N may represent the ratio of the flexible bandwidth (BW) to the normal bandwidth. Thus, data rate in a flexible bandwidth system may equal Normal Rate×1/N, and delay may equal Normal Delay×N. In general, a flexible systems channel BW=channel BW of normal systems/N. Delay-Bandwidth product, Delay×BW, may remain unchanged. Furthermore, in some embodiments, a flexible waveform may be a waveform that occupies more bandwidth than a normal waveform.

Throughout this specification, the term normal system, subsystem, and/or waveform may be utilized to refer to systems, subsystems, and/or waveforms that involve embodiments that may utilize a bandwidth scaling factor that may be equal to one (e.g., N=1) or a normal or standard chip rate. These normal systems, subsystems, and/or waveforms may also be referred to as standard and/or legacy systems, subsystems, and/or waveforms. Furthermore, flexible systems, subsystems, and/or waveforms may be utilized to refer to systems, subsystems, and/or waveforms that involve embodiments that may utilize a bandwidth scaling factor that may not be equal to one (e.g., N=2, 3, 4, 8, ½, ¼, etc.). For N>1, or if a chip rate is decreased, the bandwidth of a waveform may decrease. Some embodiments may utilize bandwidth scaling factors or chip rates that increase the bandwidth. For example, if N<1, or if the chip rate is increased, then a waveform may be expanded to cover bandwidth larger than a normal waveform. Flexible systems, subsystems, and/or waveforms may also be referred to as fractional systems, subsystems, and/or waveforms in some cases. Fractional systems, subsystems, and/or waveforms may or may not change bandwidth, for example. A fractional system, subsystem, or waveform may be flexible because it may offer more possibilities than a normal or standard system, subsystem, or waveform (e.g., N=1 system).

Figure 4:
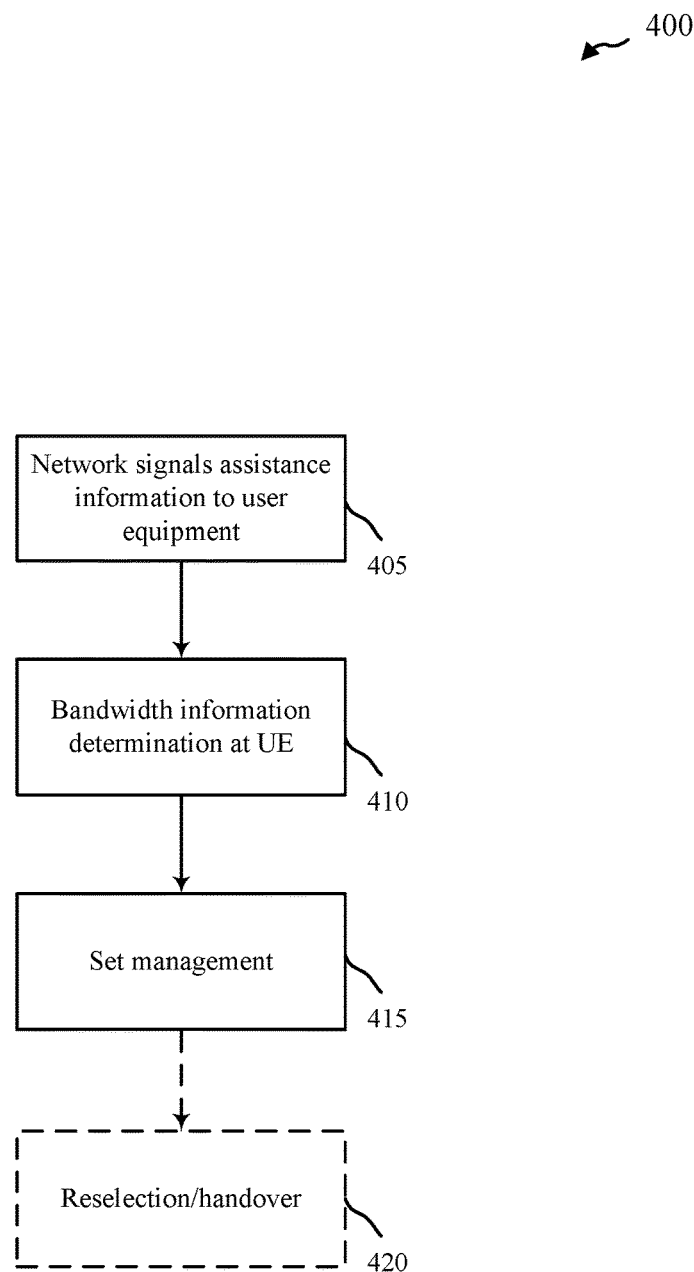
FIG. 4 shows a block diagram illustrating mobility management procedures in accordance with various embodiments.
Figure 9:
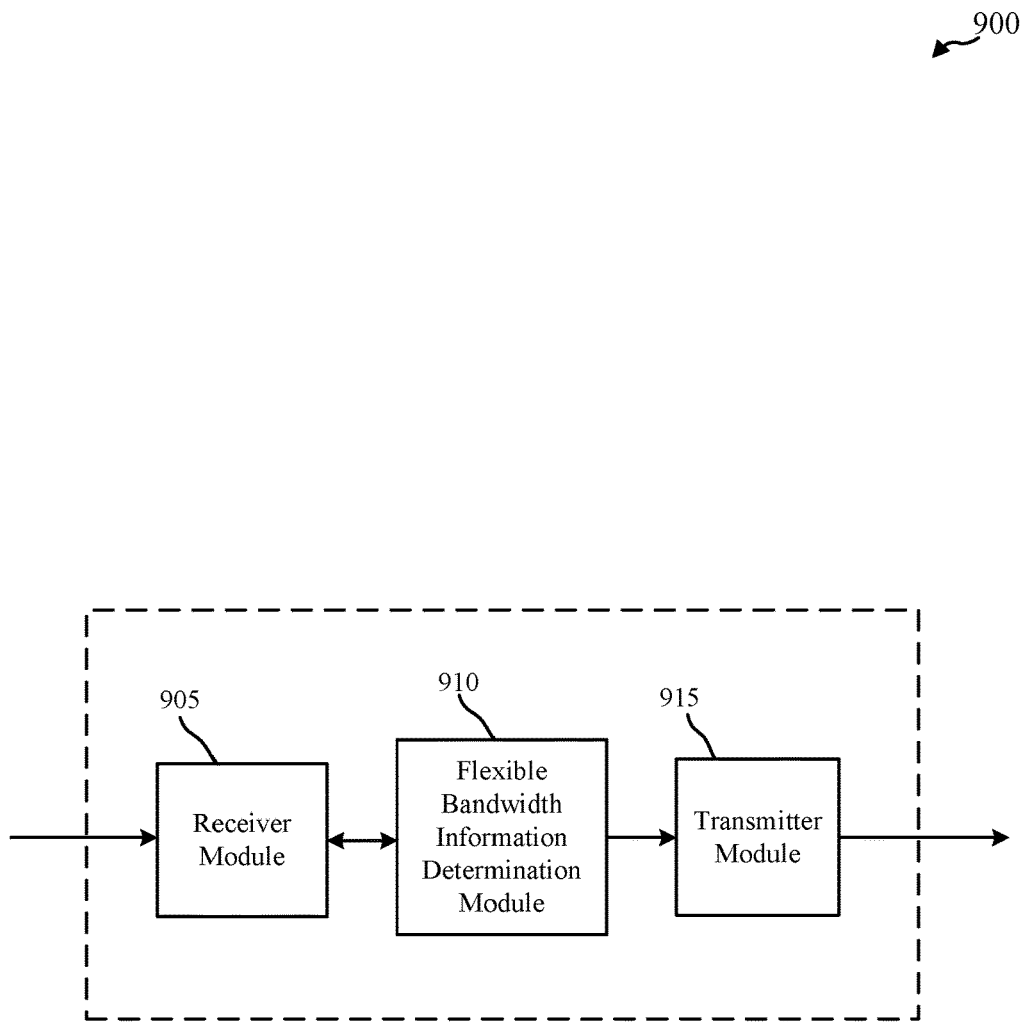
FIG. 9 shows a block diagram of a device in accordance with various embodiments.

Turning now to FIG. 4, a block diagram 400 illustrates mobility management procedures in accordance with various embodiments. Aspects of block diagram may be implemented in whole or in part utilizing various wireless communications devices including, but not limited to: a base station 105 as seen in FIG. 1, FIG. 2, FIG. 3, FIG. 10, and/or FIG. 13; a device 900 as seen in FIG. 9, a core network 130 and/or controller 120 as seen in FIG. 1 and/or FIG. 10,: a user equipment 115 as seen in FIG. 1, FIG. 2, FIG. 3, FIG. 10, FIG. 12, and/or FIG. 13; and/or a device 1100 as seen in FIG. 11. At block 405, a network may signal assistance information to UE to assist UE in mobility management. The network may signal assistance information about neighboring available cells to the UEs, for example. At block 410, bandwidth information, such as one or more bandwidth scaling factors N or flexible bandwidths, may be determined at a UE. This may be part of a search procedure. For example, the UE may search for cells or carriers autonomously and/or with the help of the network. The cells may be flexible bandwidth cells; the carriers may be flexible bandwidth carriers. In some cases, the bandwidth scaling factors and/or flexible bandwidths associated with different flexible bandwidth cells or carriers may be signaled to the UE from the network, through a base station, for example. In cases where the value of N or the bandwidth is not signaled to the UE, the UE may determine the one or more bandwidth scaling factors and/or flexible bandwidths associated with one or more cells using a variety of procedures as discussed herein. For example, many N hypotheses could be tried. At block 415, set management procedures may be performed. For example, a UE may develop various mobility cell sets to be used for further handovers and reselections as shown in block 420.

Embodiments may include a variety of mobility management scenarios. A flexible bandwidth UE, for example, may use the mobility procedures to migrate according to different mobility scenarios. A flexible bandwidth UE may move from a flexible bandwidth carrier or cell with bandwidth scaling factor N=x to another flexible bandwidth carrier or cell with the same N. These cells may be deployed on the same carrier frequency but separated by different PSCs, for example. The two cells could also be deployed on different carrier frequencies in some embodiments. A flexible bandwidth UE may move from a flexible bandwidth carrier or cell with N=x to another flexible bandwidth carrier or cell with a different N, N=y. Both cells may be deployed on different carrier frequencies. A flexible bandwidth UE may move from a flexible bandwidth carrier or cell with N=x to a non-flexible, or legacy, cell, such as UMTS and/or GSM cells, for example. Likewise, the UE may move from a non-flexible bandwidth carrier or cell, or legacy cell, such as UMTS and/or GSM to a flexible bandwidth carrier or cell. Both cells may be deployed on different carrier frequencies. In some cases, the non-flexible bandwidth carrier or cell, or legacy cell, such as UMTS and/or GSM cells, and flexible bandwidth carrier or cells may be co-located at the same site or deployed in different sites. In some embodiments, once a UE moves to a flexible bandwidth carrier or cell, it may perform mobility procedures (e.g., send registration message, location area updates, routing area updates, etc.) as currently performed in non-flexible networks, or legacy networks, such as UMTS networks, for example. While some of the above examples include UMTS and/or GSM cells, other embodiments may utilize other radio access technologies (RATs). Flexible bandwidth system may be treated as an extension (or mode) of the legacy RAT or can be treated as a separate RAT in some cases.

FIG. 5 shows a table 500 that includes several different mobility scenarios, though some embodiments may utilize other scenarios. Handover/Reselection scenarios 510 show several different cases of possible UE moves from one carrier to another, where the carriers may be flexible bandwidth carriers and/or normal (or legacy) bandwidth carriers. Deployment scenarios 520 for each case reflect whether the deployment scenarios may be intra-frequency, inter-frequency, and/or inter-RAT. Aspects of table 500 may be implemented in whole or in part utilizing various wireless communications devices including, but not limited to: a base station 105 as seen in FIG. 1, FIG. 2, FIG. 3, FIG. 10, and/or FIG. 13; a device 900 as seen in FIG. 9, a core network 130 and/or controller 120 as seen in FIG. 1 and/or FIG. 10,: a user equipment 115 as seen in FIG. 1, FIG. 2, FIG. 3, FIG. 10, FIG. 12, and/or FIG. 13; and/or a device 1100 as seen in FIG. 11.

Some embodiments may include approaches for determining one or more bandwidth information, such as bandwidth scaling factor N and/or flexible bandwidth, at a UE. In some cases, the flexible bandwidth information, such as N, may not be signaled. As a result, the UE may have to determine which N hypotheses to use in acquiring and decoding information on the cell, which may be a flexible bandwidth cell, though may be a normal bandwidth (i.e., N=1) cell in some cases. Different approaches may be utilized in determining N including, but not limited to: random ordered N approaches, delay ordered N approaches, storing N value in UE Neighbor Record approaches, spectrum measurement approaches, and/or spectrum calculation approaches.

Some embodiments utilize a random order N approach for determining N. For initial acquisition, when no information may be available to the UE regarding flexible bandwidth scaling factor information, it may be possible to configure a UE with an N which may be always used at during initial cell acquisition. The UE may also determine the value of N to use at power up by randomly selecting an N value on the fly. In some cases, the different hypotheses may be tried until successful detection. Some embodiments may utilize a static or non-static list of scaling factors. For inter-frequency neighboring cell searches, it may be possible to pre-configure the UE with a specific N search order or the UE may randomly select the order in which to search N. In some embodiments, the UE may utilize the same N for searching intra-frequency cell searches as the N the UE utilized on the serving cell (the cell that signaled the assistance information to the UE).

Figure 6A:
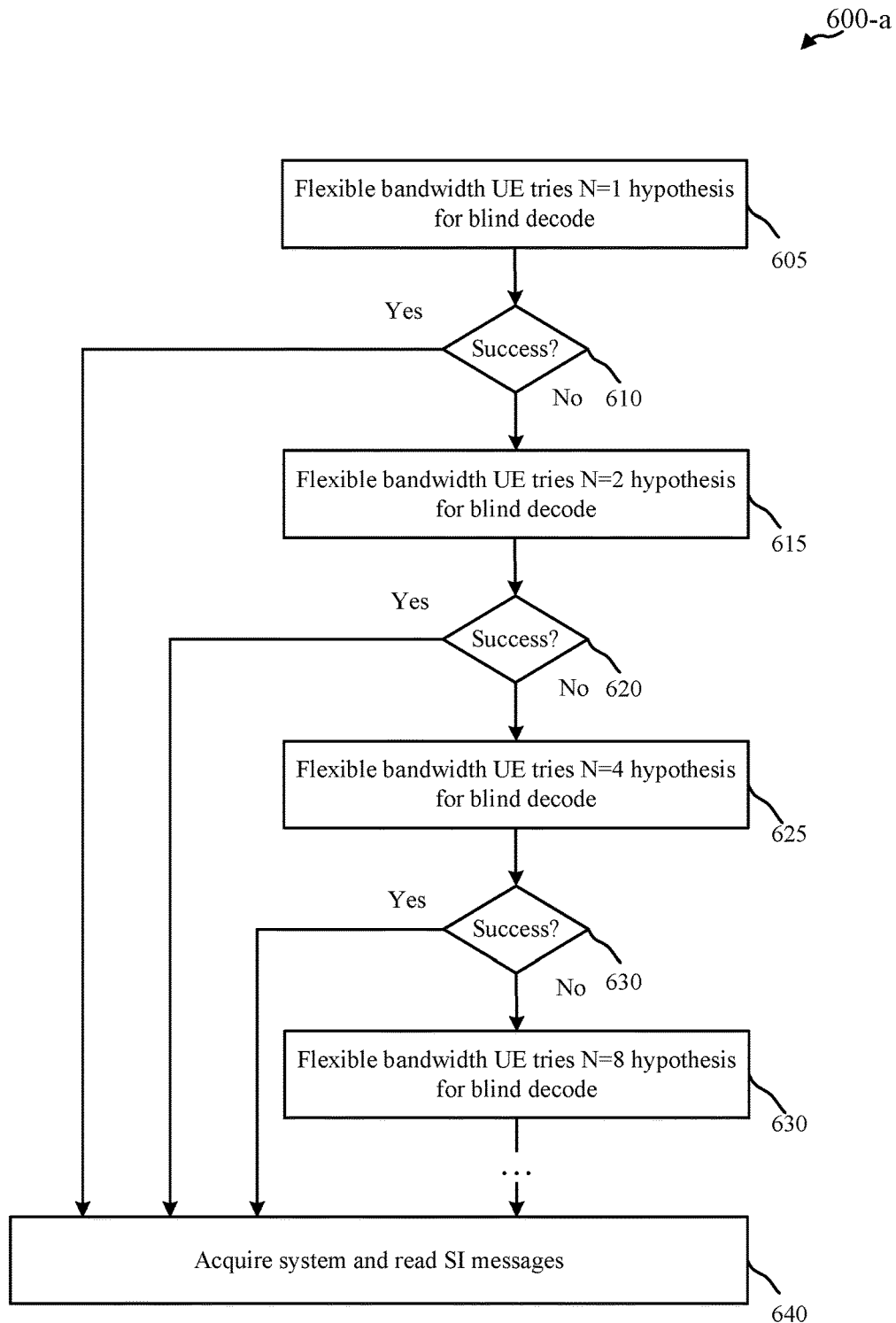
FIG. 6A shows a flow diagram in accordance with various embodiments.
Figure 6B:
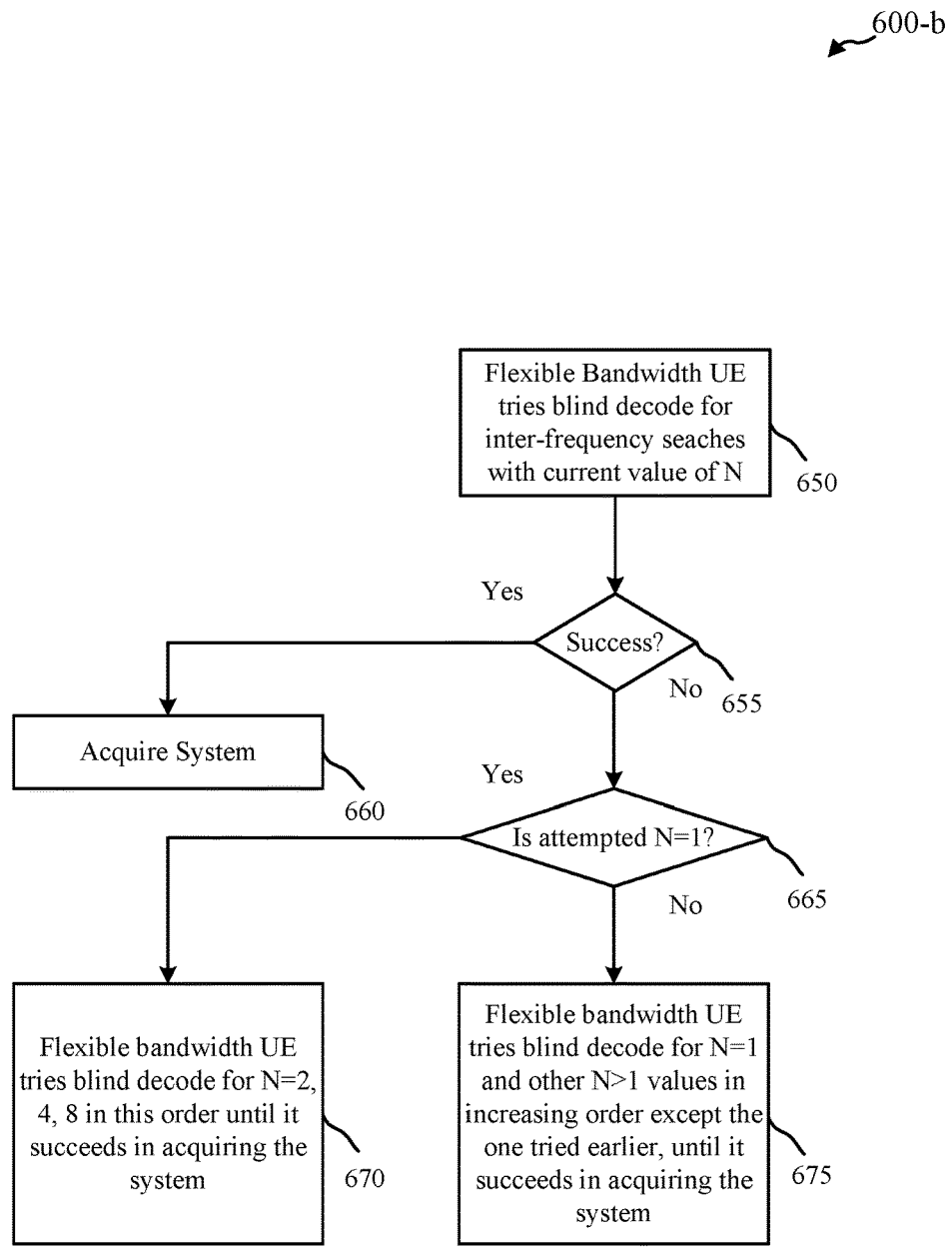
FIG. 6B shows a flow diagram in accordance with various embodiments.

Some embodiments utilize delay ordered N approaches for determining N. FIG. 6A shows a flow diagram 600-*a* based on a delay order N approach for initial acquisition. For example, delay ordered N approaches may be utilized for initial acquisition. This example utilizes N=1, 2, 4, and 8, though other values may be utilized in other cases. When no a priori information may be available on how many carriers are full BW (N=1), half BW (N=2), quarter BW (N=4) etc., some embodiments assume that they equally probable (i.e., their weights are same). In such a case, trying progressively higher value of N may minimize the acquisition delay with respect to legacy systems. For example, a flexible bandwidth UE may try N=1 hypothesis as seen in block 605. If it fails at block 610, it may try N=2 hypothesis at block 615. If it also fails at block 620, it may try N=4 hypothesis at block 625, and so on as seen in blocks 630 and 635, until a system is acquired at block 640. Delay ordered N approaches may be utilized for inter-frequency searches. Other embodiments may utilize other values of N, besides 1, 2, 4, or 8. Furthermore, some embodiments may utilizing parallel decoding or serially decoding. FIG. 6B shows a flow diagram 600-*b* based on a delay order N approach for inter-frequency searches. For example, when no a priori information may be available on how many carriers are full BW (N=1), half BW (N=2), quarter BW (N=4) etc., some embodiments assume equally probable (i.e., their weights are same). In such a case, a flexible bandwidth UE may try the value of N for the current frequency at block 650. If it is successful at block 655, system acquisition may occur at block 660. If it fails at block 655, flexible bandwidth UE may try N=1 if it is not the current N value at block 665. If it fails at block 665, the flexible bandwidth UE may try higher values of N one after another at block or 670 or 675. Other embodiments may utilize other values of N, besides 1, 2, 4, or 8. Furthermore, some embodiments may utilizing parallel decoding or serially decoding. Flow diagrams 600-*a* and/or 600-*b* may be implemented utilizing various wireless communications devices including, but not limited to: a user equipment 115 as seen in FIG. 1, FIG. 2, FIG. 3, FIG. 10, FIG. 11, and/or FIG. 12; and/or a device 900 as seen in FIG. 9.

Some embodiments utilize storing N value in UE neighbor record approaches for determining N. Information regarding the bandwidth scaling factor may be stored in other areas, including multiple areas. Other approaches may include a mapping of frequency to bandwidth scaling factor (e.g., in a searching mechanism). In some cases, information such as a flexible bandwidth itself may be stored rather than a bandwidth scaling factor for the flexible bandwidth. For example, a UE may keep records of cells signaled from the network and cells that have been detected. Example of these records may include the UE maintained neighbor list and/or the most recently used table (MRU), for example. A neighbor list may include a list of cells that are signaled from the network and have been identified (or unidentified) as well as cells not signaled but detected by the UE, for example. For the identified and detected cells, their corresponding carrier frequencies and PSCs may be maintained in the record. Most Recently Used (MRU) tables may enable a UE to remember the most recently used systems (mode, band, and/or channel) on which service was provided. The table may be ordered from the most recently used system to the least recently used system. In some embodiments, a flexible bandwidth UE now stores the N value of frequencies/carriers on which the UE previously camped or identified. In some cases, there may only be one N value on any frequency. Thus, the hit for cell search and blind decode may only be for first time the UE attempts to acquire that cell/carrier. During subsequent times, the UE may retrieve the N value from the record and attempts acquisition with the N value. This approach may be used alone or in combination with the other N determination approaches. In some cases, an operator may use a different N even for the same frequency at different parts of their network (e.g. rural, sub urban, urban areas). The UE may map the location to the different Ns that the UE has detected. Also, the UE may use different methods at different locations. Other information (e.g., PLMN) may be used in order to utilize a different database or method.

Some embodiments utilize methods for N estimation or determination from bandwidth (BW) measurement(s) by a UE. For example, the UE may be a good spectrum analyzer and may be able to measure the bandwidth while performing the frequency scan. To estimate the effective transmission bandwidth, the UE may measure the energy corresponding to the largest transmission bandwidth possible (e.g., transmission bandwidth for N=1). After the frequency scan, the UE may determine the bandwidth of the waveform (absolute bandwidth, or 3-dB bandwidth, or the equivalent bandwidth, for example). With the bandwidth known, the UE may infer the value of N or the bandwidth. It may be more efficient to determine spectrum bandwidth by using an algorithm that starts with the smallest possible bandwidth. This may be expected to work for both full scan (power up or coming back to service) where many carrier frequencies may be searched and list scan where a few carrier frequencies may be used. The spectral measurement method can be used alone or in combination with the other bandwidth information determination approaches.

Figure 7:
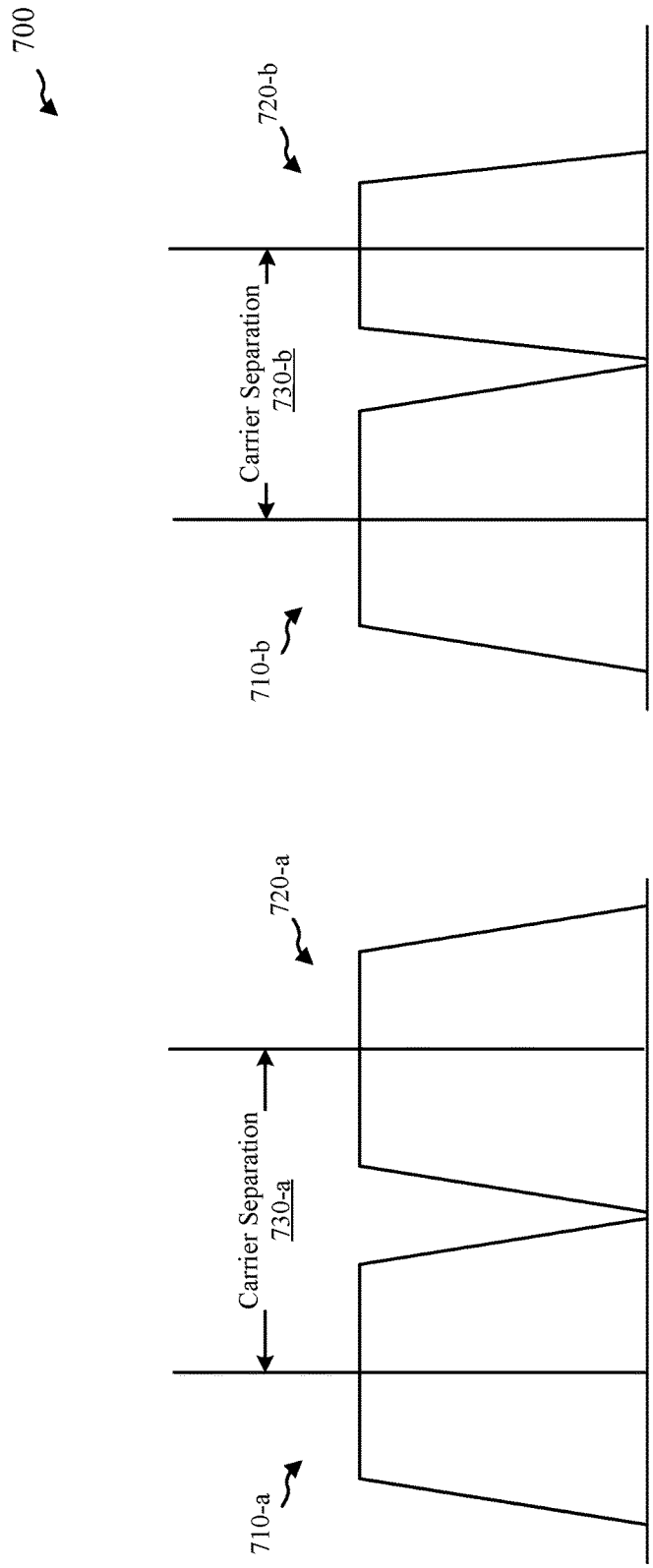
FIG. 7 shows spectrum diagrams in accordance with various embodiments.

Some embodiments utilize spectrum calculation(s) for determining bandwidth information, such as bandwidth scaling factors N and/or flexible bandwidths. Another approach involving spectrum estimation may be possible when the UE has information (carrier frequency and bandwidth, for example) about neighboring inter-frequency cells. For example, by using carrier separation between two adjacent cells, the UE may be able to compute the most likely bandwidth of a target cell. For example, if the carrier separation between target cell and neighboring cell is 5 MHz, then the target cell is likely an N=1 flexible bandwidth cell, if the separation is 3.75 MHz, then the target cell is likely N=2 flexible bandwidth cell. FIG. 7 shows spectrum diagrams 700 that reflect these two examples. For example, by using carrier separation 730 between two adjacent cells 710 and 720, the UE may be able to compute the most likely bandwidth of a target cell. For example, if the carrier separation 730-*a* between target cell 720-*a* and neighboring cell 710-*a* is a specific value, such as 5 MHz, then the target cell is likely an N=1 flexible bandwidth cell. If the carrier separation 730-*b* is between a target cell 720-*b* and a neighbor cell 710-*b* is another value, such as 3.75 MHz, then the target cell 720-*b* is likely N=2 flexible bandwidth cell. This method may be susceptible to errors in case adjacent carrier information is unknown. For example, GSM cells or other flexible bandwidth cells may be located next to the target cell but the information may not be available to the UE. The carrier separation may be from the channel numbers. Spectrum diagrams 700 may be utilizing by various wireless communications devices including, but not limited to: a user equipment 115 as seen in FIG. 1, FIG. 2, FIG. 3, FIG. 10, FIG. 11, and/or FIG. 12; and/or a device 900 as seen in FIG. 9. The spectrum calculation method can also be combined with other methods for determining the bandwidth scaling factor, N.

In some situations, there may be ambiguity with respect to the bandwidth scaling factors N. For example if there may be 3.75 MHz separation, one carrier may be thought to be N=1 and the other N=2, but it may not know which is which. In some situations, a bandwidth of one of the carries may be known. For example, if it is know that one carrier may be a full bandwidth carrier (e.g., N=1) and the channel spacing may be 3.75 MHz, it may be possible to guess the bandwidth or the bandwidth scaling factor of the other carrier, such as that the other carrier is a ½ bandwidth carrier (e.g., N=2).

Some embodiments may utilize ordering with a priori information to facilitate N determination. With no a priori assisting information, all N values ($p_i$) may be equally likely. Assuming the possibility of M different Ns and the weight for each N, $W_i$, may be equally likely, then $W_i$ may be expressed as:

$$W_i = p_i = 1/M.$$

With some a priori information (e.g., 60% of cells are N=1 i.e. $p_1$=0.6, 30% are N=8 i.e. $p_8$=0.3 and 10% are N=4 i.e. $p_4$=0.1), it may be possible to assign weights (w) based on their likelihoods, such as:

$$W_i = p_i \text{ where } p_i\text{'s are not equally likely.}$$

Flexible bandwidth UE may attempt to decode N values in order of decreasing weights (e.g., tries N=1, then N=8 and then N=4 as $W_1 > W_8 > W_4$). For inter-frequency searches, flexible bandwidth UEs may follow the same strategy as above. With additional information such as the acquisition delay associated with each N, the weights may be further augmented (e.g., $W_i = p_i/d_i$, where $d_i$ may be the acquisition delay for N=i; and $d_i > d_j$ for i>j [$d_8 \sim 2^*d_4$ and $d_4 \sim 2^*d_2$]). Additional information from other approaches (e.g., spectral measurement and/or spectrum calculation) maybe used to argument the weights.

Figure 8:
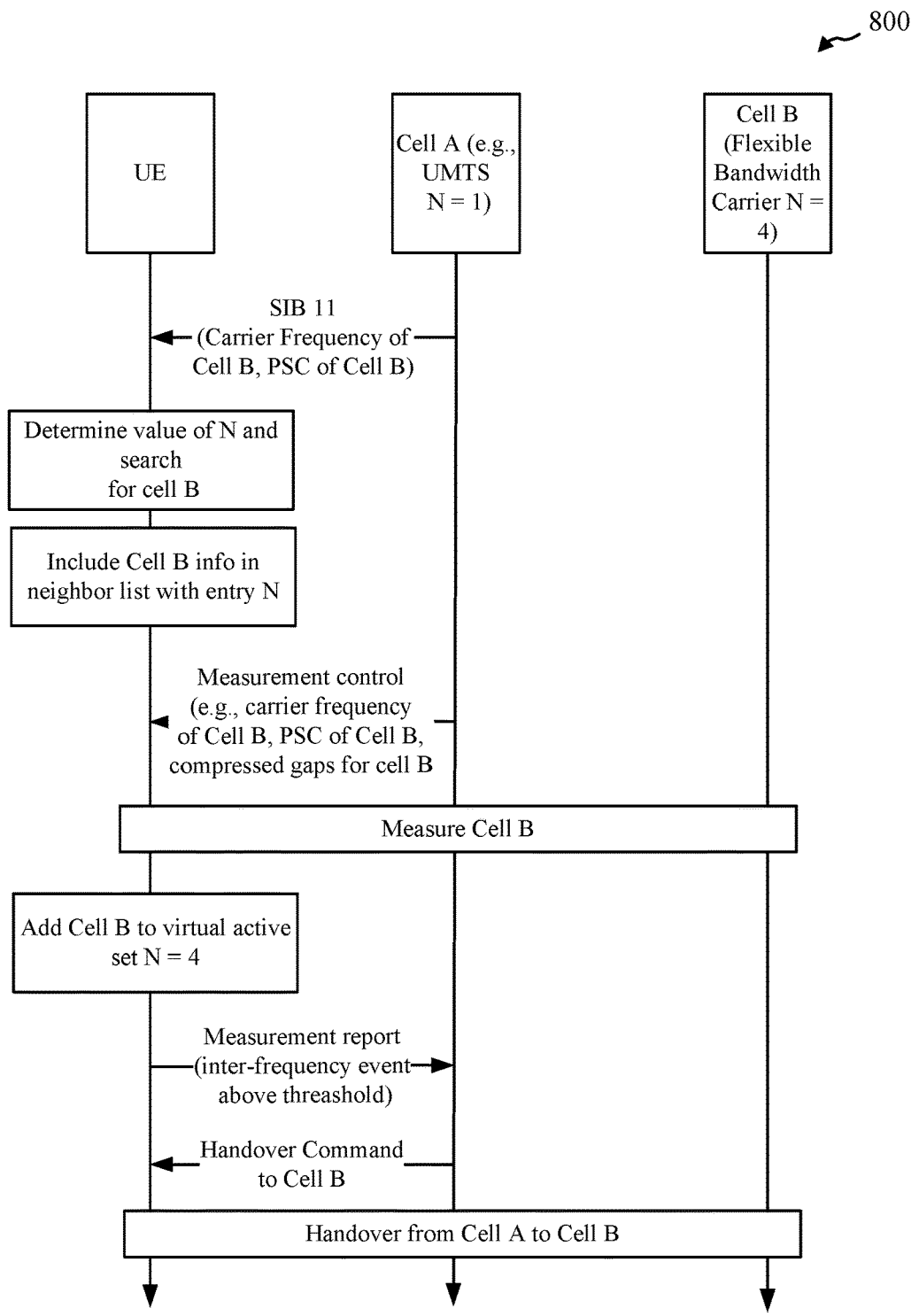
FIG. 8 shows a communications diagram in accordance with various embodiments.

FIG. 8 shows a communications diagram 800 that shows an example of a UE moving from a UMTS cell, Cell A, to a flexible bandwidth carrier or cell, Cell B, with N=4. While the UE may be in idle mode on Cell B, flexible bandwidth carrier or cell information may be signaled to UE on SIB 11

(e.g., carrier frequency, primary scrambling code (PSC), etc.) but the N value for cell B may not be signaled. UE may determine N using spectrum estimation and stores the N information for cell B) . . . UE may determine N using spectrum estimation and may store the N information for cell B. The UE may transition into connected mode with Cell A for data or voice connection. In the connected mode, if the link between the UE and the network experiences degradation in signal strength, the network may provide compressed gaps to the UE to measure flexible bandwidth carrier or Cell B. Since Cell B may have already been identified in idle mode, the N and cell timing may be known so the acquisition delay may be minimized The UE may then measure the signal strength on the cell and may add the cell to a virtual active set due in case the strong signal strength may be detected on that cell. In the case the signal strength of Cell B is above a threshold, an inter-frequency event may be triggered so UE sends a measurement report to the network. The network may order an inter-frequency handover in case the network finds the flexible bandwidth carrier or Cell B to be more suited for the UE than Cell A. The UE may tune to flexible bandwidth carrier or Cell B and may update the network with its location (e.g., sending a routing area update (RAU) or a location area update (LAU) as currently performed in UMTS networks). Aspects of communications diagram 800 may be implemented in whole or in part utilizing various wireless communications devices including, but not limited to: a base station 105 as seen in FIG. 1, FIG. 2, FIG. 3, FIG. 11, and/or FIG. 12; a device 900 as seen in FIG. 9, a core network 130 and/or controller 120 as seen in FIG. 1 and/or FIG. 11,: and/or a user equipment 115 as seen in FIG. 1, FIG. 2, FIG. 3, FIG. 10, FIG. 11, and/or FIG. 12.

Turning next to FIG. 9, a block diagram illustrates a device 900 for wireless communications in accordance with various embodiments. The device 900 may be an example of one or more aspects of user equipment 115 described with reference to FIG. 1, FIG. 2, FIG. 3, FIG. 10, FIG. 11, and/or FIG. 12. The device 900 may also be a processor. The device 900 may include a receiver module 905, a flexible bandwidth information determination module 910, and/or a transmitter module 915. Each of these components may be in communication with each other.

These components of the device 900 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The flexible bandwidth information determination module 910 may be configured to interpret a first set of received data at a user equipment (UE). The flexible bandwidth information determination module 910 may be configured to determine bandwidth information associated with a flexible bandwidth carrier may be determined at the UE utilizing the first set of received data. The bandwidth information may include a second set of data different from the first set of data in that the second set of data includes the bandwidth information. The bandwidth information may include least a bandwidth scaling factor or a bandwidth associated with the flexible bandwidth carrier.

The flexible bandwidth information determination module 910 may be configured to utilize, at the UE, the determined bandwidth information associated with the flexible bandwidth carrier to facilitate mobility management with respect to the flexible bandwidth carrier. Some embodiments of device 900 may include a mobility management module (not shown). Facilitating mobility management may include facilitating mobility between the one or more flexible bandwidth carriers and another flexible bandwidth carrier, where the flexible bandwidth carriers utilize the same bandwidth information, such as the same bandwidth scaling factors and/or the same flexible bandwidth. Facilitating mobility management may include facilitating mobility between the one of more flexible bandwidth carriers and another flexible bandwidth carrier, where the flexible bandwidth carriers utilize different bandwidth information. Facilitating mobility management may include facilitating mobility between the one of more flexible bandwidth carriers and normal bandwidth carrier.

Determining the bandwidth information associated with the flexible bandwidth carrier using the flexible bandwidth information determination module 910 may include utilizing a random sequence of bandwidth scaling factors to determine the bandwidth information associated with the flexible bandwidth carrier. Determining the bandwidth information associated with the flexible bandwidth carrier may include utilizing a pre-determined sequence of bandwidth scaling factors to determine the bandwidth information associated with the flexible bandwidth carrier. The pre-determined sequence may include a sequence of increasing bandwidth scaling factors. The pre-determined sequence may include a sequence of bandwidth scaling factors starting with a current bandwidth scaling factor of a cell sending the first set of received data. For example, this sequence may be set by a manufacturer, can be set by an operator, can be set in a SIM, determined the UE and stored for subsequent use, etc. Utilizing the pre-determined sequence of bandwidth scaling factors may utilize one or more cell search and blind decodes of a flexible bandwidth cell based on the bandwidth scaling factors from the pre-determined sequence.

Determining the bandwidth information associated with the flexible bandwidth carrier using the flexible bandwidth information determination module 910 may include utilizing a stored bandwidth scaling factor. Determining the bandwidth information associated with the flexible bandwidth carrier may include utilizing one or more spectrum measurements. Determining the bandwidth information associated with the flexible bandwidth carrier may include utilizing one or more spectrum calculations.

Determining the bandwidth information associated with the flexible bandwidth carrier using the flexible bandwidth information determination module 910 may include utilizing a priori information regarding one or more bandwidth scaling factors of the flexible bandwidth carrier. Determining the bandwidth information associated with the flexible bandwidth carrier may include utilizing a priori information regarding the probability of deploying one or more flexible bandwidth carriers with one or more bandwidth scaling factors in a given area. Determining the bandwidth information associated with the flexible bandwidth carrier may include utilizing a priori information regarding the probability of deploying one or more flexible bandwidth carriers with one or more bandwidth scaling factors in a given area combined with the delay ordered scaling factor approach.

The a priori information may be at least transmitted to the UE, calculated at the UE and used subsequently, or provided to the UE through a SIM. The bandwidth information may depend upon a location.

In some embodiments, the receiver module 905 is used to receive the first set of data from the serving cell and also receive the control channel data from the fractional carrier during cell search and acquisition. In some embodiments, the transmitter module is used to transmit message either to a serving cell or the flexible banddwidht carrier whose N and/or flexible bandwidth was determined using the flexible bandwidth information determination 910. In some embodiments, the flexible bandwidth information determination module 910 instructs the receiver module 905 to receive different bandwidth information, such as scaling factors N and/or flexible bandwidths. In some embodiments, the transmitter module 915 may transmit information regarding flexible waveforms, scaling factors, and/or flexible bandwidths from the device 900 to a base stations or a core network. In some embodiments, the transmitter module 915 may transmit information, such as flexible waveforms, scaling factors, and/or flexible bandwidths to base stations or a core network such that these devices or systems may utilize flexible waveforms.

Figure 10:
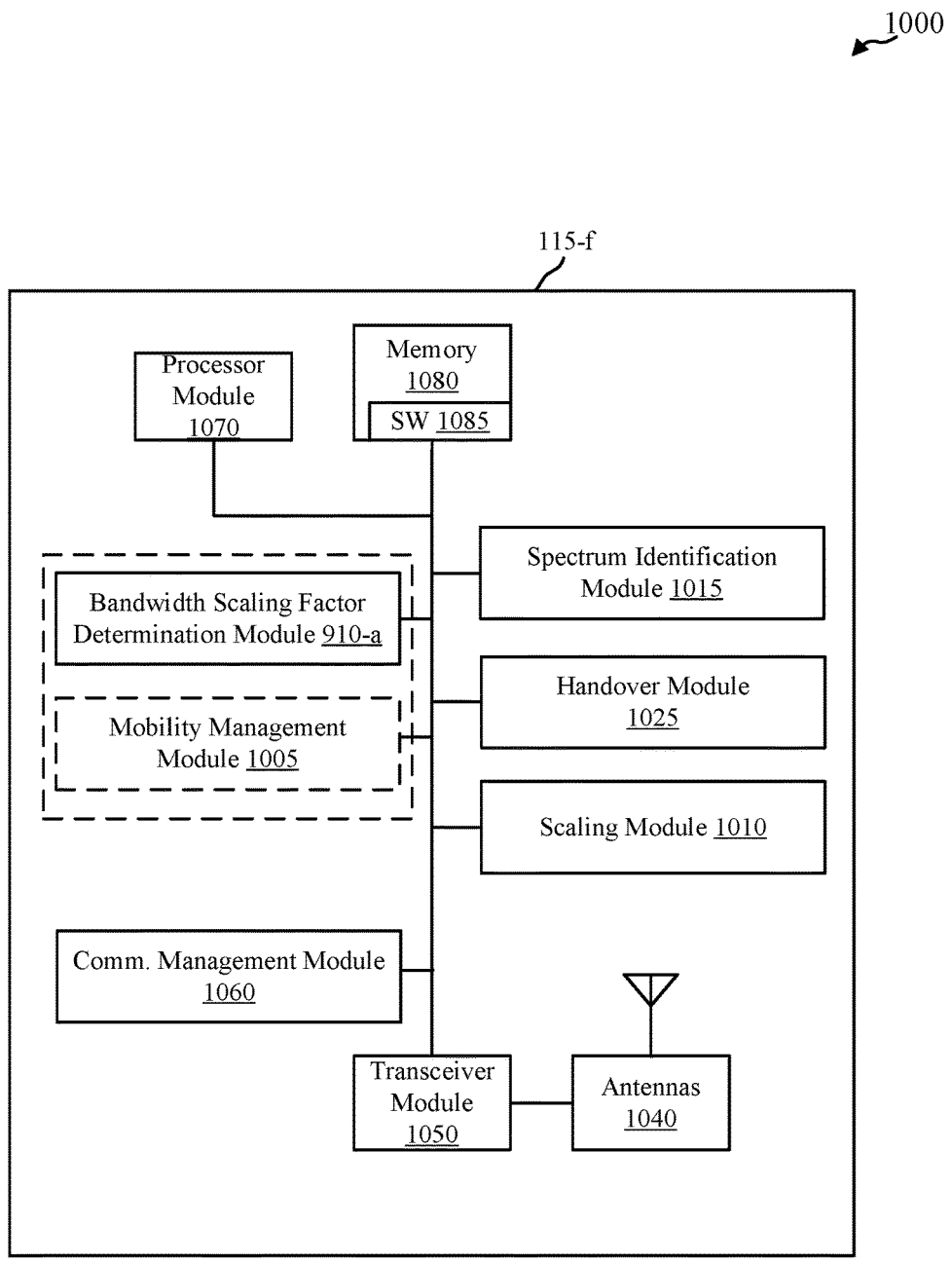
FIG. 10 shows a block diagram of a user equipment in accordance with various embodiments.
Figure 11:
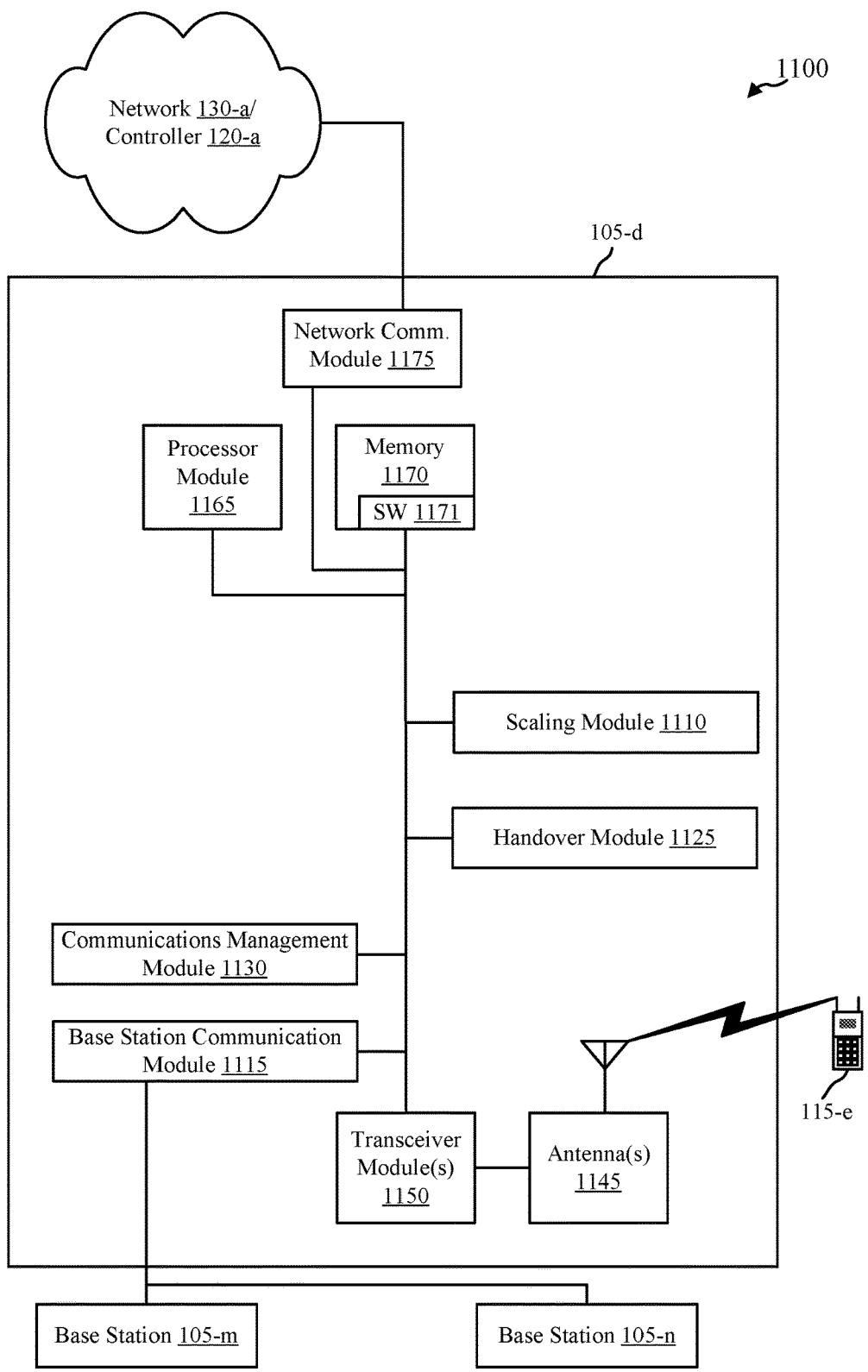
FIG. 11 shows a block diagram of a wireless communications system in accordance with various embodiments.

FIG. 10 is a block diagram 1000 of a user equipment 115-e configured for wireless communication, including in some cases configurations to facilitate the mobility management, in accordance with various embodiments. The user equipment 115-e may have any of various configurations, such as personal computers (e.g., laptop computers, netbook computers, tablet computers, etc.), cellular telephones, PDAs, digital video recorders (DVRs), internet appliances, gaming consoles, e-readers, etc. The user equipment 115-e may have an internal power supply (not shown), such as a small battery, to facilitate mobile operation. In some embodiments, the user equipment 115-e may be the user equipment 115 of FIG. 1, FIG. 2, FIG. 3, FIG. 11, and/or FIG. 12, and/or the device 900 of FIG. 9. The user equipment 115-e may be a multi-mode user equipment. The user equipment 115-e may be referred to as a wireless communications device in some cases.

The user equipment 115-e may include antennas 1040, a transceiver module 1050, memory 1080, and a processor module 1070, which each may be in communication, directly or indirectly, with each other (e.g., via one or more buses). The transceiver module 1050 is configured to communicate bi-directionally, via the antennas 1040 and/or one or more wired or wireless links, with one or more networks, as described above. For example, the transceiver module 1050 may be configured to communicate bi-directionally with base stations 105 of FIG. 1, FIG. 2, FIG. 3, FIG. 11, and/or FIG. 12. The transceiver module 1050 may include a modem configured to modulate the packets and provide the modulated packets to the antennas 1040 for transmission, and to demodulate packets received from the antennas 1040. While the user equipment 115-e may include a single antenna, the user equipment 115-e will typically include multiple antennas 1040 for multiple links.

The memory 1080 may include random access memory (RAM) and read-only memory (ROM). The memory 1080 may store computer-readable, computer-executable software code 1085 containing instructions that are configured to, when executed, cause the processor module 1070 to perform various functions described herein (e.g., call processing, database management, message routing, etc.). Alternatively, the software 1085 may not be directly executable by the processor module 1070 but be configured to cause the computer (e.g., when compiled and executed) to perform functions described herein.

The processor module 1070 may include an intelligent hardware device, e.g., a central processing unit (CPU) such as those made by Intel® Corporation or AMD®, a microcontroller, an application-specific integrated circuit (ASIC), etc. The processor module 1070 may include a speech encoder (not shown) configured to receive audio via a microphone, convert the audio into packets (e.g., 30 ms in length) representative of the received audio, provide the audio packets to the transceiver module 1050, and provide indications of whether a user is speaking. Alternatively, an encoder may only provide packets to the transceiver module 1050, with the provision or withholding/suppression of the packet itself providing the indication of whether a user is speaking.

According to the architecture of FIG. 10, the user equipment 115-e may further include a communications management module 1060. The communications management module 1060 may manage communications with other user equipment 115. By way of example, the communications management module 1060 may be a component of the user equipment 115-e in communication with some or all of the other components of the user equipment 115-e via a bus. Alternatively, functionality of the communications management module 1060 may be implemented as a component of the transceiver module 1050, as a computer program product, and/or as one or more controller elements of the processor module 1070.

The components for user equipment 115-e may be configured to implement aspects discussed above with respect to device 900 of FIG. 9 and may not be repeated here for the sake of brevity. For example, the bandwidth scaling factor determination module 910-a may be the flexible bandwidth information determination module 910 of FIG. 9. User equipment 115-e may also include a mobility management module 1005 configured to provide mobility management as discussed above, for example, with respect to device 900. The mobility management module 1005 may work with, or may be part of, a handover module 1025 in some cases.

The user equipment 115-e may also include a spectrum identification module 1015. In some cases, the spectrum identification module 1015 may be implemented as part of the bandwidth scaling factor determination module 910-a. The spectrum identification module 1015 may be utilized to identify spectrum available for flexible waveforms. In some embodiments, the handover module 1025 may be utilized to perform handover procedures of the user equipment 115-e from one base station to another. For example, the handover module 1025 may perform a handover procedure of the user equipment 115-e from one base station to another where normal waveforms are utilized between the user equipment 115-e and one of the base stations and flexible waveforms are utilized between the user equipment and another base station. In some cases, inter-frequency handover can happen within the same base station; handover may thus be within cells supported by the same base station. A scaling module 1010 may be utilized to scale and/or alter chip rates to generate flexible waveforms. In some embodiments, the scaling module 1010 may be implemented as part of the transceiver module 1050.

In some embodiments, the transceiver module 1050 in conjunction with antennas 1040, along with other possible components of user equipment 115-e, may transmit information regarding flexible waveforms and/or scaling factors from the user equipment 115-e to base stations or a core network. The transceiver module 1050 may also be used in receiving messages from the network via a base station. In some embodiments, the transceiver module 1050, in conjunction with antennas 1040 along with other possible components of user equipment 115-*e*, may transmit information, such as flexible waveforms and/or scaling factors, to base stations or a core network such that these devices or systems may utilize flexible waveforms.

FIG. 11 shows a block diagram of a communications system 1100 that may be configured for wireless communication in accordance with various embodiments. This system 1100 may be an example of aspects of the system 100 depicted in FIG. 1, systems 200 of FIG. 2, system 300 of FIG. 3, and/or system 1200 of FIG. 12. The base station 105-*d* may include antennas 1145, a transceiver module 1150, memory 1170, and a processor module 1165, which each may be in communication, directly or indirectly, with each other (e.g., over one or more buses). The transceiver module 1150 may be configured to communicate bi-directionally, via the antennas 1145, with the user equipment 115-*f*, which may be a multi-mode user equipment. The transceiver module 1150 (and/or other components of the base station 105-*d*) may also be configured to communicate bi-directionally with one or more networks. In some cases, the base station 105-*d* may communicate with the network 130-*a* and/or controller 120-*a* through network communications module 1175. Base station 105-*d* may be an example of an eNodeB base station, a Home eNodeB base station, a NodeB base station, and/or a Home NodeB base station. Controller 120-*a* may be integrated into base station 105-*d* in some cases, such as with an eNodeB base station.

Base station 105-*d* may also communicate with other base stations 105, such as base station 105-*m* and base station 105-*n*. Each of the base stations 105 may communicate with user equipment 115-*f* using different wireless communications technologies, such as different Radio Access Technologies. In some cases, base station 105-*d* may communicate with other base stations such as 105-*m* and/or 105-*n* utilizing base station communication module 1115. In some embodiments, base station communication module 1115 may provide an X2 interface within an LTE wireless communication technology to provide communication between some of the base stations 105. In some embodiments, base station 105-*d* may communicate with other base stations through controller 120-*a* and/or network 130-*a*.

The memory 1170 may include random access memory (RAM) and read-only memory (ROM). The memory 1170 may also store computer-readable, computer-executable software code 1171 containing instructions that are configured to, when executed, cause the processor module 1165 to perform various functions described herein (e.g., call processing, database management, message routing, etc.). Alternatively, the software 1171 may not be directly executable by the processor module 1165 but be configured to cause the computer, e.g., when compiled and executed, to perform functions described herein.

The processor module 1165 may include an intelligent hardware device, e.g., a central processing unit (CPU) such as those made by Intel® Corporation or AMD®, a microcontroller, an application-specific integrated circuit (ASIC), etc. The processor module 1165 may include a speech encoder (not shown) configured to receive audio via a microphone, convert the audio into packets (e.g., 30 ms in length) representative of the received audio, provide the audio packets to the transceiver module 1150, and provide indications of whether a user is speaking. Alternatively, an encoder may only provide packets to the transceiver module 1150, with the provision or withholding/suppression of the packet itself providing the indication of whether a user is speaking.

The transceiver module 1150 may include a modem configured to modulate the packets and provide the modulated packets to the antennas 1145 for transmission, and to demodulate packets received from the antennas 1145. While some examples of the base station 105-*d* may include a single antenna 1145, the base station 105-*d* preferably includes multiple antennas 1145 for multiple links which may support carrier aggregation. For example, one or more links may be used to support macro communications with user equipment 115-*f*.

According to the architecture of FIG. 11, the base station 105-*d* may further include a communications management module 1130. The communications management module 1130 may manage communications with other base stations 105. By way of example, the communications management module 1130 may be a component of the base station 105-*d* in communication with some or all of the other components of the base station 105-*d* via a bus. Alternatively, functionality of the communications management module 1130 may be implemented as a component of the transceiver module 1150, as a computer program product, and/or as one or more controller elements of the processor module 1165.

In some embodiments, a handover module 1125 may be utilized to perform handover procedures of the user equipment 115-*f* from one base station 105 to another. For example, the handover module 1125 may perform a handover procedure of the user equipment 115-*f* from base station 105-*d* to another where normal waveforms are utilized between the user equipment 115-*f* and one of the base stations and flexible waveforms are utilized between the user equipment and another base station. The handover module 1125 may be part of controller 120-*a* rather than part of base station 105-*b* in some embodiments, such as when system 1100 may be a UMTS system. In some cases, inter-frequency handover can happen within the same base station; handover may thus be within cells supported by the same base station 105-*d*. A scaling module 1110 may be utilized to scale and/or alter chip rates to generate flexible waveforms. In some embodiments, the scaling module 1110 may be implemented as part of the transceiver 1150.

In some embodiments, the transceiver module 1150 in conjunction with antennas 1145, along with other possible components of base station 105-*d*, may transmit information regarding flexible waveforms and/or bandwidth scaling factors from the base station 105-*d* to the user equipment 115-*f*, to other base stations 105-*m*/105-*n*, or core network 130-*a*. In some embodiments, the transceiver module 1150 in conjunction with antennas 1145, along with other possible components of base station 105-*d*, may transmit information to the user equipment 115-*f*, to other base stations 105-*m*/105-*n*, or core network 130-*a*, such as flexible waveforms and/or bandwidth scaling factors, such that these devices or systems may utilize flexible waveforms. The transceiver module 1050 may also be used in receiving messages from the network via a base station.

Figure 12:
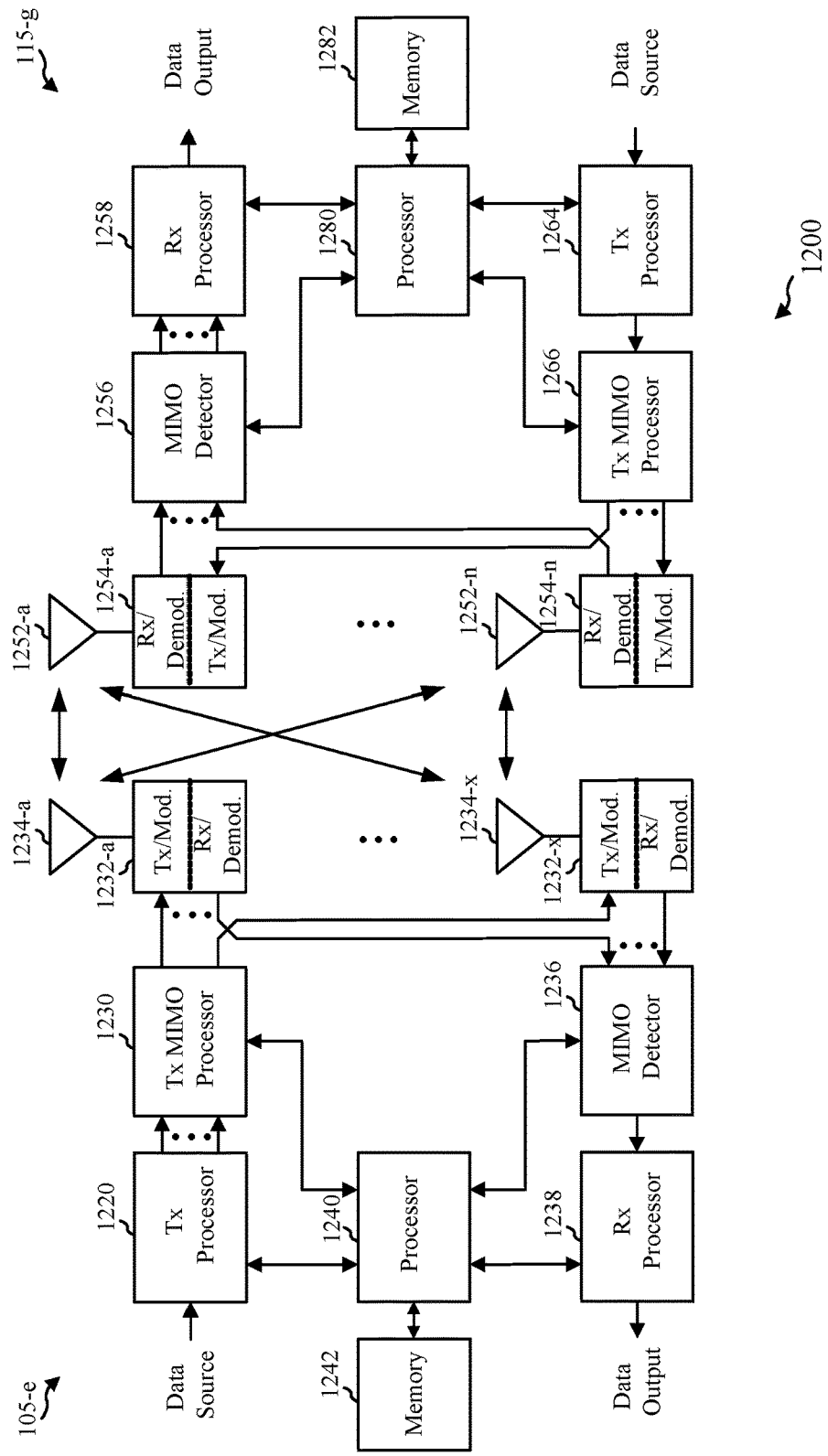
FIG. 12 shows a block diagram of a wireless communications system that includes a base station and a user equipment in accordance with various embodiments.

FIG. 12 is a block diagram of a system 1200 including a base station 105-*e* and a user equipment 115-*g* in accordance with various embodiments. This system 1200 may be an example of the system 100 of FIG. 1, systems 200 of FIG. 2, system 300 of FIG. 3, and/or system 1100 of FIG. 11. The base station 105-*e* may be equipped with antennas 1234-*a* through 1234-*x*, and the user equipment 115-*g* may be equipped with antennas 1252-*a* through 1252-*n*. At the base station 105-*e*, a transmit processor 1220 may receive data from a data source.

The transmitter processor 1220 may process the data. The transmitter processor 1220 may also generate reference symbols, and a cell-specific reference signal. A transmit (TX) MIMO processor 1230 may perform spatial processing (e.g., precoding) on data symbols, control symbols, and/or reference symbols, if applicable, and may provide output symbol streams to the transmit modulators 1232-*a* through 1232-*x*. Each modulator 1232 may process a respective output symbol stream (e.g., for OFDM, etc.) to obtain an output sample stream. Each modulator 1232 may further process (e.g., convert to analog, amplify, filter, and upconvert) the output sample stream to obtain a downlink (DL) signal. In one example, DL signals from modulators 1232-*a* through 1232-*x* may be transmitted via the antennas 1234-*a* through 1234-*x,* respectively. The transmitter processor 1220 may receive information from a processor 1240. The processor 1240 may be configured to generate flexible waveforms through altering a chip rate and/or utilizing a bandwidth scaling factor; this may be done dynamically in some cases. The processor 1240 may also provide for different alignment and/or offsetting procedures. The processor 1240 may also utilize scaling and/or chip rate information to perform measurements on the other subsystems, perform handoffs to the other subsystems, etc. In some cases, the measurement and/or handoff may be coordinated at a separate controller rather than the base station 105-*d*. The processor 1240 may invert the effects of time stretching associated with the use of flexible bandwidth through parameter scaling. In some embodiments, the processor 1240 may be implemented as part of a general processor, the transmitter processor 1220, and/or the receiver processor 1238.

At the user equipment 115-*g*, the user equipment antennas 1252-*a* through 1252-*n* may receive the DL signals from the base station 105-*e* and may provide the received signals to the demodulators 1254-*a* through 1254-*n*, respectively. Each demodulator 1254 may condition (e.g., filter, amplify, down-convert, and digitize) a respective received signal to obtain input samples. Each demodulator 1254 may further process the input samples (e.g., for OFDM, etc.) to obtain received symbols. A MIMO detector 1256 may obtain received symbols from all the demodulators 1254-*a* through 1254-*n*, perform MIMO detection on the received symbols if applicable, and provide detected symbols. A receive processor 1258 may process (e.g., demodulate, deinterleave, and decode) the detected symbols, providing decoded data for the user equipment 115-*g* to a data output, and provide decoded control information to a processor 1280, or memory 1282.

On the uplink (UL), at the user equipment 115-*g*, a transmitter processor 1264 may receive and process data from a data source. The transmitter processor 1264 may also generate reference symbols for a reference signal. The symbols from the transmitter processor 1264 may be precoded by a transmit MIMO processor 1266 if applicable, further processed by the demodulators 1254-*a* through 1254-*n* (e.g., for SC-FDMA, etc.), and be transmitted to the base station 105-*e* in accordance with the transmission parameters received from the base station 105-*e*. The transmitter processor 1264 may also be configured to generate flexible waveforms through altering a chip rate and/or utilizing a bandwidth scaling factor; this may be done dynamically in some cases. The transmitter processor 1264 may receive information from processor 1280. The processor 1280 may provide for different alignment and/or offsetting procedures. The processor 1280 may also utilize scaling and/or chip rate information to perform measurements on the other subsystems, perform handoffs to the other subsystems, perform reselection, etc. The processor 1280 may invert the effects of time stretching associated with the use of flexible bandwidth through parameter scaling. At the base station 105-*e*, the UL signals from the user equipment 115-*g* may be received by the antennas 1234, processed by the demodulators 1232, detected by a MIMO detector 1236 if applicable, and further processed by a receive processor. The receive processor 1238 may provide decoded data to a data output and to the processor 1280. In some embodiments, the processor 1280 may be implemented as part of a general processor, the transmitter processor 1264, and/or the receiver processor 1258.

In some embodiments, the processor 1280 is configured mobility management in accordance with various embodiments. For example, processor 1280 or other components of user equipment 115-*g* may be configured for determining bandwidth information, such as bandwidth scaling factors and/or flexible bandwidths, at user equipment 115-*g*. Different approaches may be utilized in determining bandwidth information including, but not limited to: random ordered bandwidth scaling factor approaches, delay ordered bandwidth scaling factor approaches, stored bandwidth scaling factor value in UE Neighbor Record approaches, spectrum measurement approaches, spectrum calculation approaches, and/or a priori approaches. Some embodiments include interpreting a first set of received data at processor 1280. Bandwidth information associated with a flexible bandwidth carrier may be determined with processor 1280 utilizing the first set of received data. The bandwidth information may include a second set of data different from the first set of data in that the second set of data includes the bandwidth information. Determining the bandwidth information at the user equipment 115-*g* may facilitate mobility management with respect to a flexible bandwidth carrier, which may be utilized by base station 105-*e* that may also utilize the determined bandwidth information.

Processor 1280 or other components of user equipment 115-*g* may utilize the determined bandwidth information associated with the flexible bandwidth carrier to facilitate mobility management with respect to the flexible bandwidth carrier. Facilitating mobility management may include facilitating mobility between the one of more flexible bandwidth carriers and another flexible bandwidth carrier, where the flexible bandwidth carriers utilize the same scaling factor. Facilitating mobility management may include facilitating mobility between the one of more flexible bandwidth carriers and another flexible bandwidth carrier, where the flexible bandwidth carriers utilize different scaling factor. Facilitating mobility management may include facilitating mobility between the one of more flexible bandwidth carriers and normal bandwidth carrier.

Determining the bandwidth information associated with the flexible bandwidth carrier using processor 1280 or other components of user equipment 115-*g* may include utilizing a random sequence of bandwidth scaling factors to determine the bandwidth information associated with the flexible bandwidth carrier. Determining the bandwidth information associated with the flexible bandwidth carrier may include utilizing a pre-determined sequence of bandwidth scaling factors to determine the bandwidth information associated with the flexible bandwidth carrier. The pre-determined sequence may include a sequence of increasing bandwidth scaling factors. The pre-determined sequence may include a sequence of bandwidth scaling factors starting with a current bandwidth scaling factor of a cell sending the first set of received data. Utilizing the pre-determined sequence of bandwidth scaling factors may utilize one or more cell search and blind decodes of a flexible bandwidth cell based on the bandwidth scaling factors from the pre-determined sequence.

Determining the bandwidth information associated with the flexible bandwidth carrier with processor 1280 or other components of user equipment 115-*g* may include utilizing a stored bandwidth scaling factor. Determining the bandwidth information associated with the flexible bandwidth carrier may include utilizing one or more spectrum measurements. Determining the bandwidth information associated with the flexible bandwidth carrier may include utilizing one or more spectrum calculations.

Determining the bandwidth information associated with the flexible bandwidth carrier with processor 1280 or other components of user equipment 115-*g* may include utilizing a priori information regarding one or more bandwidth scaling factors of the flexible bandwidth carrier. Determining the bandwidth information associated with the flexible bandwidth carrier may include utilizing a priori information regarding the probability of deploying one or more flexible bandwidth carriers with one or more bandwidth scaling factors in a given area. Determining the bandwidth information associated with the flexible bandwidth carrier may include utilizing a priori information regarding the probability of deploying one or more flexible bandwidth carriers with one or more bandwidth scaling factors in a given area combined with the delay ordered scaling factor approach.

Figure 13A:
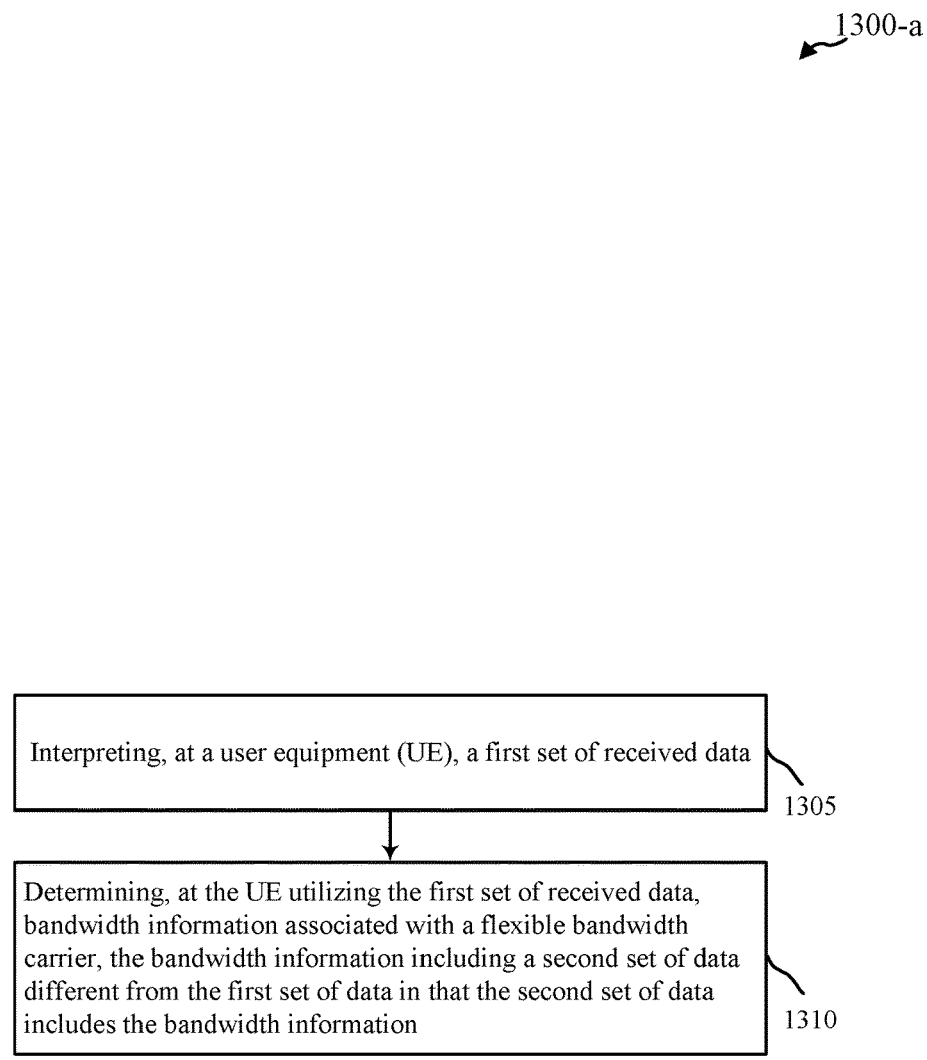
FIG. 13A shows a flow diagram of a method of wireless communications in accordance with various embodiments.

Turning to FIG. 13A, a flow diagram of a method 1300-*a* of wireless communications in accordance with various embodiments is provided. Method 1300-*a* may be implemented utilizing various wireless communications devices including, but not limited to: a user equipment 115 as seen in FIG. 1, FIG. 2, FIG. 3, FIG. 10, FIG. 11, and/or FIG. 12; and/or a device 900 as seen in FIG. 9.

At block 1305, a first set of received data may be interpreted at a user equipment (UE). At block 1310, a bandwidth information associated with a flexible bandwidth carrier may be determined at the UE utilizing the first set of received data. The bandwidth information may include a second set of data different from the first set of data in that the second set of data includes the bandwidth information. The bandwidth information may include least a bandwidth scaling factor or a bandwidth associated with the flexible bandwidth carrier.

Some embodiments include utilizing, at the UE, the determined bandwidth information associated with the flexible bandwidth carrier to facilitate mobility management with respect to the flexible bandwidth carrier. Facilitating mobility management may include facilitating mobility between the one of more flexible bandwidth carriers and another flexible bandwidth carrier, where the flexible bandwidth carriers utilize the same bandwidth information. Facilitating mobility management may include facilitating mobility between the one of more flexible bandwidth carriers and another flexible bandwidth carrier, where the flexible bandwidth carriers utilize different bandwidth information. Facilitating mobility management may include facilitating mobility between the one of more flexible bandwidth carriers and normal bandwidth carrier.

Determining the bandwidth information associated with the flexible bandwidth carrier may include utilizing a random sequence of bandwidth scaling factors to determine the bandwidth information associated with the flexible bandwidth carrier. Determining the bandwidth information associated with the flexible bandwidth carrier may include utilizing a pre-determined sequence of bandwidth scaling factors to determine the bandwidth information associated with the flexible bandwidth carrier. The pre-determined sequence may include a sequence of increasing bandwidth scaling factors. The pre-determined sequence may include a sequence of bandwidth scaling factors starting with a current bandwidth scaling factor of a cell sending the first set of received data. Utilizing the pre-determined sequence of bandwidth scaling factors may utilize one or more cell search and blind decodes of a flexible bandwidth cell based on the bandwidth scaling factors from the pre-determined sequence. The sequence of bandwidth scaling factors may be at least determined by the UE and stored for subsequent use, set by a manufacturer, set by an operator, or set in a SIM. These techniques may utilize a sequence of flexible bandwidths instead of a sequence of bandwidth scaling factors.

Determining the bandwidth information associated with the flexible bandwidth carrier may include utilizing a stored bandwidth scaling factor. Determining the bandwidth information associated with the flexible bandwidth carrier may include utilizing one or more spectrum measurements. Determining the bandwidth information associated with the flexible bandwidth carrier may include utilizing one or more spectrum calculations. The bandwidth information may depend upon a location.

Determining the bandwidth information associated with the flexible bandwidth carrier may include utilizing a priori information regarding one or more bandwidth scaling factors of the flexible bandwidth carrier. Determining the bandwidth information associated with the flexible bandwidth carrier may include utilizing a priori information regarding the probability of deploying one or more flexible bandwidth carriers with one or more bandwidth scaling factors in a given area. Determining the bandwidth information associated with the flexible bandwidth carrier may include utilizing a priori information regarding the probability of deploying one or more flexible bandwidth carriers with one or more bandwidth scaling factors in a given area combined with the delay ordered scaling factor approach. The a priori information may be at least transmitted to the UE, calculated at the UE and used subsequently, or provided to the UE through a SIM.

Figure 13B:
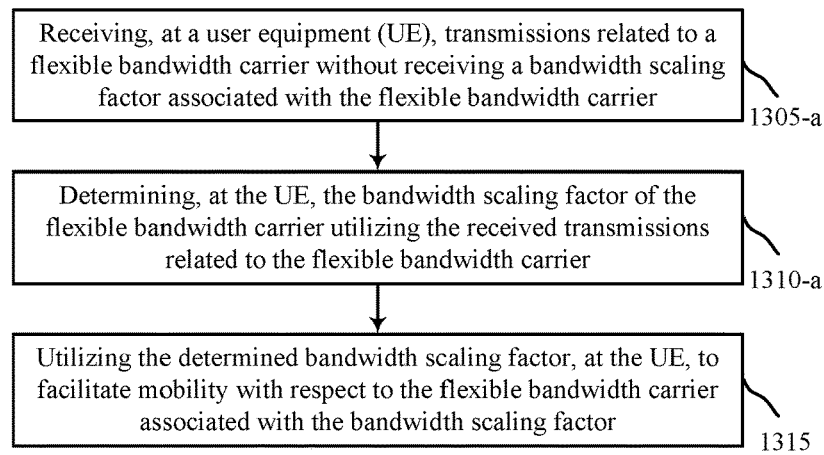
FIG. 13B shows a flow diagram of a method of wireless communications in accordance with various embodiments.

Turning to FIG. 13B, a flow diagram of a method 1300-*b* of wireless communications in accordance with various embodiments is provided. Method 1300-*b* may be implemented utilizing various wireless communications devices including, but not limited to: a user equipment 115 as seen in FIG. 1, FIG. 2, FIG. 3, FIG. 10, FIG. 11, and/or FIG. 12; and/or a device 900 as seen in FIG. 9. Method 1300-*a* may be an example of method 1300-*b* of FIG. 13B.

At block 1305-*a*, transmissions related to a flexible bandwidth carrier may be received at a user equipment without receiving a bandwidth scaling factor associated with the flexible bandwidth carrier. At block 1310-*a*, the bandwidth scaling factor of the flexible bandwidth carrier may be determined at the UE utilizing the received transmissions related to the flexible bandwidth carrier without receiving the bandwidth scaling factor. At block 1315, the determined bandwidth scaling factor may be utilized at the UE to facilitate mobility with respect to the flexible bandwidth carrier associated with the bandwidth scaling factor.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general-purpose or special-purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communications comprising:
receiving, at a user equipment (UE), mobility assistance information conveyed by a first radio frequency carrier of a first radio frequency spectrum bandwidth;
performing spectral measurements of a second radio frequency carrier of a second radio frequency spectrum bandwidth associated with the mobility assistance information;
determining, at the UE, a scaling factor associated with the second radio frequency carrier based at least in part on the spectral measurements, wherein the scaling factor comprises a ratio between the first radio frequency spectrum bandwidth and the second radio frequency spectrum bandwidth; and
communicating using a waveform generated based at least in part on the scaling factor.

2. The method of claim 1, further comprising:
utilizing a sequence of scaling factors to determine the scaling factor.

3. The method of claim 2, wherein the sequence of scaling factors comprises a random sequence of scaling factors.

4. The method of claim 2, wherein the sequence of scaling factors comprises a pre-determined sequence of scaling factors.

5. The method of claim 4, wherein the pre-determined sequence comprises a sequence of increasing scaling factors.

6. The method of claim 4, wherein the pre-determined sequence comprises a sequence of scaling factors starting with a current scaling factor of a cell sending the mobility assistance information.

7. The method of claim 2, wherein the sequence of scaling factors is at least determined by the UE and stored for subsequent use, set by a manufacturer, set by an operator, or set in a SIM.

8. The method of claim 1, further comprising:
utilizing one or more cell search and blind decodes of a cell associated with the second radio frequency carrier based at least in part on a sequence of scaling factors.

9. The method of claim 1, wherein performing spectral measurements of the second radio frequency carrier comprises:
performing a frequency scan of the second radio frequency carrier; and
measuring the second radio frequency spectrum bandwidth during the frequency scan.

10. The method of claim 9, wherein measuring the second radio frequency spectrum bandwidth comprises:
measuring energy corresponding to a transmission bandwidth of the second radio frequency carrier.

11. The method of claim 1, wherein performing spectral measurements of the second radio frequency carrier comprises:
determining a separation in the frequency domain between the first radio frequency carrier and the second radio frequency carrier, wherein determining the scaling factor is based at least in part on the separation.

12. A wireless communications system, the system comprising:
means for receiving, at a user equipment (UE), mobility assistance information conveyed by a first radio frequency carrier of a first radio frequency spectrum bandwidth;
means for performing spectral measurements of a second radio frequency carrier of a second radio frequency spectrum bandwidth associated with the mobility assistance information;
means for determining, at the UE, a scaling factor associated with the second radio frequency carrier based at least in part on the spectral measurements, wherein the scaling factor comprises a ratio between the first radio frequency spectrum bandwidth and the second radio frequency spectrum bandwidth; and
means for communicating using a waveform generated based at least in part on the scaling factor.

13. The wireless communications system of claim 12, further comprising:
means for utilizing a sequence of scaling factors to determine the scaling factor.

14. The wireless communications system of claim 13, wherein the sequence of scaling factors comprises a random sequence of scaling factors.

15. The wireless communications system of claim 13, wherein the sequence of scaling factors comprises a pre-determined sequence of scaling factors.

16. The wireless communications system of claim 15, wherein the pre-determined sequence comprises a sequence of increasing scaling factors.

17. The wireless communications system of claim 15, wherein the pre-determined sequence comprises a sequence of scaling factors starting with a current scaling factor of a cell sending the mobility assistance information.

18. The wireless communications system of claim 12, further comprising:
means for utilizing one or more cell search and blind decodes of a cell associated with the second radio frequency carrier based at least in part on a sequence of scaling factors.

19. A non-transitory computer-readable medium storing code for wireless communication, the code comprising instructions executable by a processor to:
receive, at a user equipment (UE), mobility assistance information conveyed by a first radio frequency carrier of a first radio frequency spectrum bandwidth;
perform spectral measurements of a second radio frequency carrier of a second radio frequency spectrum bandwidth associated with the mobility assistance information;
determine, at the UE, a scaling factor associated with the second radio frequency carrier based at least in part on the spectral measurements, wherein the scaling factor comprises a ratio between the first radio frequency spectrum bandwidth and the second radio frequency spectrum bandwidth; and
communicate using a waveform generated based at least in part on the scaling factor.

20. The non-transitory computer-readable medium of claim 19, wherein the code further includes instructions executable by the processor to:
utilize a sequence of scaling factors to determine the scaling factor.

21. The non-transitory computer-readable medium of claim 20, wherein the sequence of scaling factors comprises a random sequence of scaling factors.

22. The non-transitory computer-readable medium of claim 20, wherein the sequence of scaling factors comprises a pre-determined sequence of scaling factors.

23. The non-transitory computer-readable medium of claim 22, wherein the pre-determined sequence comprises a sequence of increasing scaling factors.

24. The non-transitory computer-readable medium of claim 19, wherein the code further includes instructions executable by the processor to:
utilize one or more cell search and blind decodes of a cell associated with the second radio frequency carrier based at least in part on a sequence of scaling factors.

25. A wireless communications device comprising:
a processor;
memory in electronic communication with the processor; and
instructions stored in the memory and operable, when executed by the processor, to cause the wireless communications device to:
receive, at the wireless communications device, mobility assistance information conveyed by a first radio frequency carrier of a first radio frequency spectrum bandwidth;
perform spectral measurements of a second radio frequency carrier of a second radio frequency spectrum bandwidth associated with the mobility assistance information;
determine, at the wireless communications device, a scaling factor associated with the second radio frequency carrier based at least in part on the spectral measurements, wherein the scaling factor comprises a ratio between the first radio frequency spectrum bandwidth and the second radio frequency spectrum bandwidth; and
communicate using a waveform generated based at least in part on the scaling factor.

26. The wireless communications device of claim 25, wherein the instructions are further executable by the processor to:
utilize a sequence of scaling factors to determine the scaling factor.

27. The wireless communications device of claim 26, wherein the sequence of scaling factors comprises a random sequence of scaling factors.

28. The wireless communications device of claim 26, wherein the sequence of scaling factors comprises a pre-determined sequence of scaling factors.

29. The wireless communications device of claim 28, wherein the pre-determined sequence comprises a sequence of increasing scaling factors.

30. The wireless communications device of claim 25, wherein the instructions are further executable by the processor to:
   utilize one or more cell search and blind decodes of a cell associated with the second radio frequency carrier based at least in part on a sequence of scaling factors.

* * * * *